(12) United States Patent
Saito

(10) Patent No.: US 8,194,998 B2
(45) Date of Patent: Jun. 5, 2012

(54) PRECEDING VEHICLE DETECTION SYSTEM

(75) Inventor: Toru Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1163 days.

(21) Appl. No.: 12/022,670

(22) Filed: Jan. 30, 2008

(65) Prior Publication Data

US 2008/0180528 A1 Jul. 31, 2008

(51) Int. Cl.
*G06K 9/00* (2006.01)
*G06K 9/40* (2006.01)

(52) U.S. Cl. ........................ 382/274; 382/104

(58) Field of Classification Search .......... 382/206, 382/104, 274; 348/148; 701/36
See application file for complete search history.

(56) References Cited

U.S. PATENT DOCUMENTS

| | | | | |
|---|---|---|---|---|
| 5,307,136 A * | 4/1994 | Saneyoshi | ..................... | 356/3.14 |
| 5,410,346 A * | 4/1995 | Saneyoshi et al. | ............ | 348/116 |
| 5,837,994 A * | 11/1998 | Stam et al. | ................. | 250/208.1 |
| 6,370,261 B1 * | 4/2002 | Hanawa | ......................... | 382/104 |
| 6,498,620 B2 * | 12/2002 | Schofield et al. | ............ | 348/148 |
| 6,731,777 B1 * | 5/2004 | Nishigaki et al. | ............ | 382/106 |
| 6,861,809 B2 * | 3/2005 | Stam | ............................... | 315/82 |
| 6,868,322 B2 * | 3/2005 | Stam et al. | ...................... | 701/36 |
| 6,891,563 B2 * | 5/2005 | Schofield et al. | ............ | 348/148 |
| 6,919,548 B2 * | 7/2005 | Stam et al. | .................... | 250/205 |
| 6,947,577 B2 * | 9/2005 | Stam et al. | .................... | 382/104 |
| 7,315,241 B1 * | 1/2008 | Daily et al. | .................... | 340/525 |
| 7,346,191 B2 * | 3/2008 | Sano | ............................ | 382/104 |
| 7,619,668 B2 * | 11/2009 | Saka et al. | ..................... | 348/251 |
| 7,619,680 B1 * | 11/2009 | Bingle et al. | ................... | 348/361 |
| 7,672,510 B2 * | 3/2010 | Nagaoka et al. | .............. | 382/170 |
| 7,936,944 B2 * | 5/2011 | Sato et al. | ..................... | 382/274 |
| 7,949,190 B2 * | 5/2011 | Wu et al. | ........................ | 382/206 |
| 2004/0143380 A1 * | 7/2004 | Stam et al. | ....................... | 701/36 |
| 2006/0114318 A1 * | 6/2006 | Saka et al. | ...................... | 348/61 |
| 2006/0115121 A1 * | 6/2006 | Saka et al. | ...................... | 382/104 |
| 2007/0032928 A1 * | 2/2007 | Kuwahara | ........................ | 701/35 |
| 2008/0181461 A1 * | 7/2008 | Saito et al. | ...................... | 382/104 |
| 2009/0174778 A1 * | 7/2009 | Allen et al. | ..................... | 348/149 |
| 2009/0228184 A1 * | 9/2009 | Ueyama et al. | .................. | 701/96 |
| 2010/0073480 A1 * | 3/2010 | Hoek et al. | ..................... | 348/148 |

FOREIGN PATENT DOCUMENTS

| | | |
|---|---|---|
| JP | 5-114099 | 5/1993 |
| JP | 06-266828 | 9/1994 |
| JP | 07-225892 | 8/1995 |
| JP | 08-241500 | 9/1996 |
| JP | 10-283461 | 4/1997 |
| JP | 10-283477 | 10/1998 |
| JP | 11-039597 | 2/1999 |
| JP | 2006-072495 | 3/2006 |

\* cited by examiner

*Primary Examiner* — Firmin Backer
*Assistant Examiner* — Michael A Chambers
(74) *Attorney, Agent, or Firm* — Smith, Gambrell & Russell, LLP

(57) ABSTRACT

A preceding vehicle detection system includes an image capture module for capturing an image of surroundings of a subject vehicle, a preceding vehicle detection module for detecting a preceding vehicle from an image captured and a tail lamp detection module for detecting a pixel area having a luminance which is larger than or equal to a threshold value on a pixel line in the image and detecting the pixel area in each pixel line while scanning pixel lines on the image in leftward and rightward directions from the pixel line set as a reference to detect areas where tail lamps of the preceding vehicle are captured from the image.

21 Claims, 32 Drawing Sheets

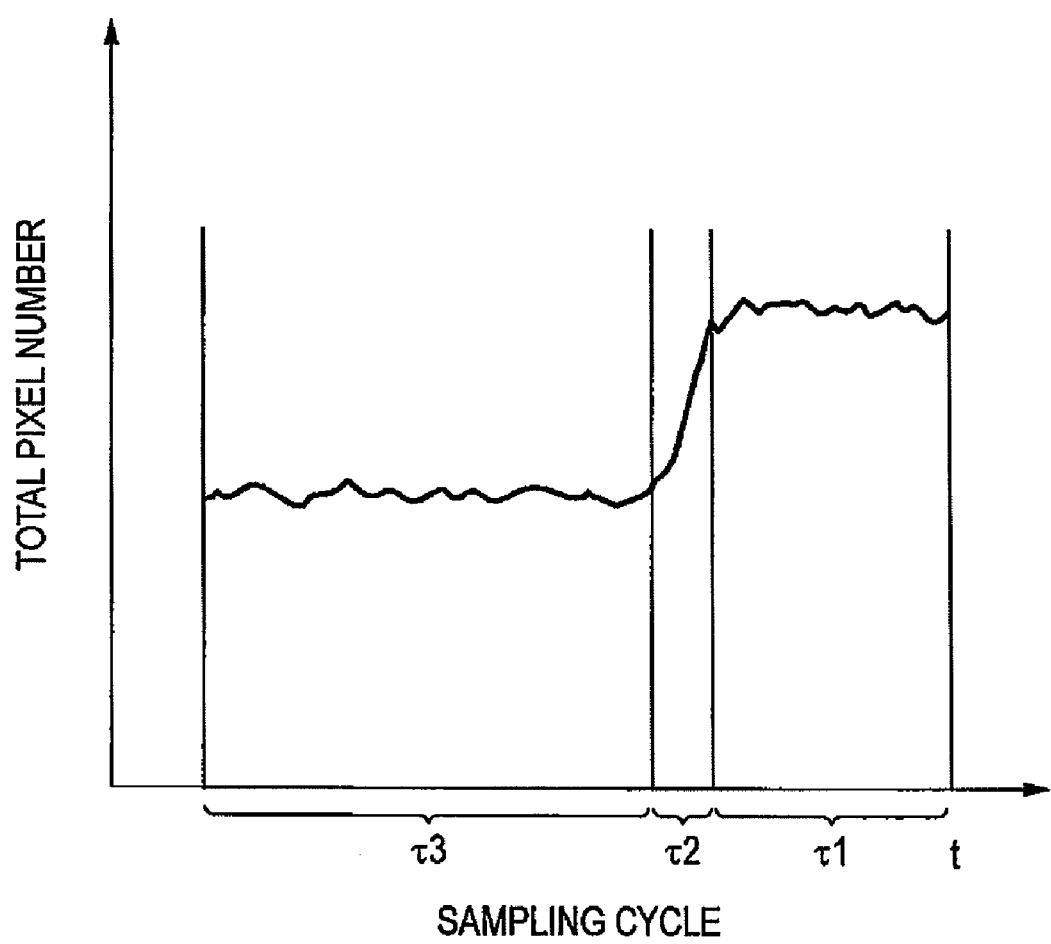

PRECEDING VEHICLE DETECTION SYSTEM

CROSS REFERENCE TO THE RELATED ARTS

The disclosure of Japanese Patent Application No. 2007-020780 filed on Jan. 31, 2007 including the specification, drawings and abstract is incorporated herein by reference in its entirety.

BACKGROUND OF INVENTION

1. Field of the Invention

The present invention relates to a preceding vehicle detection system and more particularly to a preceding vehicle detection system which can detect tail lamps of a preceding vehicle.

2. Description of the Related Art

In recent years, the development of technologies has been in progress in which a three-dimensional object lying on the periphery of a vehicle such as a passenger vehicle is detected by analyzing an image captured by a CCD (Charge Coupled Device) camera or analyzing reflected wave of radio wave emitted from a radar system (refer, for example, JP-A-7-225892). These technologies are applied, for example, to technologies for safety driving of vehicles in which the possibility of collision of the vehicle with the three-dimensional object so detected is judged, so as to activate an audible warning system to give the alarm to the driver or activate an automatic steering or automatic brake control to avoid the possible collision.

In addition, various technologies have also been under development of detecting brake lamps and tail lamps of a preceding vehicle from a captured image of what lies in front of a subject vehicle in order to enhance further the safety driving of the subject vehicle so as to prevent the collision thereof with, in particular, the preceding vehicle.

For example, in JP-A-8-241500, a system is proposed in which due to the brake lamps being red and the direction indicator lamps being amber, red areas and amber areas are separately extracted from a color image so as to detect that a preceding vehicle is turning to the left or right, or that the brakes are applied. In addition, in JP-A-11-39597, a system is proposed in which a preceding vehicle is detected by a frame line from an image and a pixel area having a luminance which is 1.5 or more times as high as a luminance average value of pixels within the frame line is detected as tail lamps and brake lamps of the preceding vehicle which are being illuminated.

Incidentally, the technology disclosed in JP-A-8-241500 can be applied to detect the tail lamps of a preceding vehicle during a night-time driving. In the system disclosed in JP-A-8-241500, however, an image capture unit which can be used together with the system is limited to an image capture unit which can capture a color image, and hence, the technology of JP-A-8-241500 cannot be applied to a preceding vehicle detection system which is equipped with only an image capture unit which captures an image which is represented as gray scale values. In addition, since colored light cannot be distinguished, light rays from the tail lamp, brake or stop lamp, turn signal lamp and license plate lamp cannot be detected discriminately by the color of light emitted therefrom.

On the other hand, with the preceding vehicle detection system disclosed in JP-A-11-39597, the tail lamps of a preceding vehicle can be detected based on an image captured in gray scale. In addition, in this system, the tail lamps of the preceding vehicle are detected based on the surface areas or positions on the image of two highly bright regions which are considered to result from the illumination of the tail lamps.

However, as is shown in FIG. 21, which is described later, for example, in a case where an oncoming vehicle Vonc is detected at the side of a vehicle ahead or preceding vehicle Vah, since a pixel area where light Ltail of a tail lamp of the preceding vehicle Vah is captured and a pixel area where light Lhead of a headlamp of the oncoming vehicle Vonc is captured are integrated with each other on the image and is hence captured as a highly bright area, the tail lamp and the headlamp cannot be discriminated from each other, and a difference in area between left and right bright areas exceeds a permissible difference or the left and right bright areas are judged as being positioned differently on the image, whereby there has occurred a case where the tail lamp of the preceding vehicle cannot be detected effectively or the detection thereof becomes unstable.

SUMMARY OF INVENTION

One or more embodiments of the invention provide a preceding vehicle detection system which can detect tail lamps of a preceding vehicle stably and in an ensured fashion. In addition, another embodiment of the invention provides a preceding vehicle detection system which can perform various operations based on information on the tail lamps of the preceding vehicle so detected.

According to a first aspect of the invention, an image capture for capturing an image of surroundings of a subject vehicle, a preceding vehicle detection unit for detecting a preceding vehicle from the image captured by the image capture, and a tail lamp detection unit for detecting a pixel area having a luminance which is larger than or equal to a first threshold value on a pixel line vertically extending in the image and detecting a pixel area in each pixel line while scanning pixel lines in leftward and rightward directions from the pixel line set as a reference so as to detect areas where tail lamps of the preceding vehicle are captured from the image, wherein when it is determined that the number of pixels of the pixel area detected on each pixel line while the pixel lines on the image are being scanned in each of the leftward and rightward directions tends to decrease as the pixel lines are scanned in each of the directions, the tail lamp detection unit finishes the detection of the pixel area at a pixel line whose pixel number is more than or equal to a constant number of times of a minimum value of the pixel number.

According to a second aspect of the invention, wherein the tail lamp detection unit stores a maximum value of the pixel number of the pixel area detected on each of the pixel lines while updating the maximum value thereof, and determines the decreasing tendency in pixel number at a point in time at which a pixel area is whose pixel number is less than a constant number times of the maximum value detected on a certain pixel line, and the determination is continued to hold during subsequent detections of the pixel area.

According to a third aspect of the invention, wherein the tail lamp detection unit respectively detects pixels which constitute central points of the detected areas from the detected areas where the left and right tail lamps of the preceding vehicle are captured, and calculates a distance between the pixels detected as the left and right central points.

According to a fourth aspect of the invention, wherein during detecting the area where the right-side tail lamp of the preceding vehicle is captured on the image, in detection of the pixel area on a pixel line which lies apart by the distance between the pixels constituting the left and right central points which was calculated in the past from a pixel line lying at a right edge of the left-side tail lamp and pixel lines lying further rightwards than the pixel line on the image, the tail lamp detection unit finishes the detection of the pixel area at a point in time at which an upper end position of the pixel area detected on the image becomes higher than an upper end position of the left-side tail lamp or at a point in time at which a lower end position of the detected pixel area becomes lower than a lower end position of the left-side tail lamp.

According to a fifth aspect of the invention, wherein the tail lamp detection unit sets a pixel line which constitutes a reference for detection of the pixel area in a pixel line which includes the pixel detected as the central point of the tail lamp in the past.

According to a sixth aspect of the invention, wherein when a current luminance of the pixel detected as the central point of the tail lamp in the past is a luminance which is equal to or higher than a second threshold value which is set equal to or higher than the first threshold value, the tail lamp detection unit detects only the pixel area which includes the pixel on the pixel line.

According to a seventh aspect of the invention, wherein the tail lamp detection unit sets a pixel line which constitutes a reference for detection of the pixel area in a pixel line which includes a pixel which lies apart by the distance between the pixels constituting the left and right central points which was calculated in the past from a pixel which constitutes the central point of the tail lamp lying on an opposite side to the tail lamp on which the detection is performed.

According to an eighth aspect of the invention, a unit for detecting left and right edges of the preceding vehicle captured in the image, wherein the tail lamp detection unit sets a pixel line which constitutes a reference for detection of the pixel area in a pixel line which lies inwards by a rate of a width between the left and right edges from the left end or right end of the preceding vehicle which is detected by the unit.

According to a ninth aspect of the invention, wherein the preceding vehicle detecting unit detects the preceding vehicle captured in the image by surrounding the preceding vehicle by a rectangular frame line, and when a plurality of pixel areas are detected on the pixel line in an image area within the frame line, the tail lamp detection unit detects a pixel area which has a largest pixel number in the plurality of pixel areas as an area where the tail lamp of the preceding vehicle is captured.

According to a tenth aspect of the invention, wherein when a pixel area which includes a lower edge of the frame line is included in the plurality of pixel areas detected on the pixel line, and the other pixel area is closer to the pixel which was detected as the central point of the tail lamp in the past or a center between an upper edge and the lower edge of the frame line than the pixel area which includes the lower edge of the frame line, the tail lamp detection unit detects the other pixel area in preference to the pixel area which includes the lower edge of the frame line.

According to a eleventh aspect of the invention, wherein when one of the areas where the left and right tail lamps of the preceding vehicle are captured is not detected in the current detection, the tail lamp detection unit estimates an image area in the image where the preceding vehicle is captured by estimating the position of the other area based on a distance between the pixels which constitutes the left and right central points on the image.

According to a twelfth aspect of the invention, distance measuring unit for measuring a distance between the subject vehicle and the preceding vehicle, wherein the tail lamp detection unit modifies the distance measured by the distance measuring unit based on a distance between the pixels which constitute the left and right central points.

According to a thirteenth aspect of the invention, wherein the image capture comprises a plurality of image capture, wherein the tail lamp detection unit calculates a distance between the subject vehicle and the preceding vehicle based on information on a disparity obtained by performing a stereo matching operation on edge portions of respective areas where the tail lamps of the preceding vehicle are captured in a plurality of images captured by the plurality of image capture.

According to a fourteenth aspect of the invention, wherein the tail lamp detection unit recognizes the illumination of a brake lamp by recognizing an increase in the number of pixels which belong to the area of the tail lamp of the preceding vehicle by a predetermined rate or more.

According to a fifteenth aspect of the invention, wherein when a difference in the number of pixels in a vertical direction between the images of the two image areas detected is within a predetermined number of pixels and a ratio of the number of pixels which belong to one of the area to the number of pixels which belong to the other area is within a predetermined ratio, the tail lamp detection unit determines that a three-dimensional object which includes the two areas is a vehicle.

According to the first aspect of the invention, by paying attention to the shape of the tail lamps of the preceding vehicle which are captured by the image capture and making use of the knowledge that a vertical length of an illuminated area of the tail lamp of the preceding vehicle gets shorter or at least does not get longer on the captured image towards left and right ends of the tail lamp as is shown in FIGS. 20A to 20C, which is described later, and that once the vertical length of the illuminated area starts getting shorter, the vertical length never starts getting longer again in any case, the area where the tail lamp is captured is detected in the captured image.

Namely, in detection of the area where the tail lamp is captured, a pixel line which extends vertically is set as a reference for detection, and pixel lines are scanned in the leftward and rightward directions from the reference pixel line to detect a pixel area having the high luminance on each of the pixel lines so scanned. As this occurs, the number of pixels in the pixel area having the high luminance which corresponds to the vertical length of the illuminated area of the tail lamp is monitored. Then, the scanning of pixel lines is stopped at a point in time at which the number of pixels of the pixel area having the high luminance starts to increase again after the number of pixels of the pixel area having the high luminance has been judged as tending to decrease and once taken a minimum value, and the detection of the tail lamp area is ended.

By adopting the detection process, even though the preceding vehicle detection system is equipped only with the image capture for capturing an image in gray scale, it is possible to eliminate effectively the influence of light from a light source other than the tail lamp of the preceding vehicle such as the light of the headlamp of the oncoming vehicle which is captured integrally with the light of the tail lamp of the preceding vehicle on the captured image. Due to this, it is possible to discriminate the light of the tail lamp of the preceding vehicle from light of any other light source effectively, thereby making it possible to detect the tail lamp of the preceding vehicle stably and in an ensured fashion in the captured image.

According to the second embodiment of the invention, when detecting the pixel area having the high luminance on each pixel line while scanning the pixel lines in each of the leftward and rightward directions, it is possible to recognize accurately the decreasing tendency of the pixel areas having the high luminance on the pixel lines by storing the pixel number of the pixel area detected on each of the pixel lines scanned while updating the maximum value thereof and recognizing, by flagging for example, the decreasing tendency in pixel number at the point in time at which the pixel area is detected on a certain pixel line whose pixel number is less than a constant number of times the maximum value stored. Therefore, the advantage of the first aspect of the invention is exhibited more accurately.

According to the third aspect of the invention, by detecting the pixels which constitute the central points of the detected areas where the left and right tail lamps of the preceding vehicle are captured to calculate the distance between the pixels detected as the left and right central points, the information on the central points and the information on the distance between the central points can be use for detection of areas where the tail lamps are captured from the next sampling cycle onward, and those pieces of information can be used for other various operations. Therefore, the advantages of the respective aspects of the invention described above are exhibited more effectively.

According to the fourth aspect of the invention, the oncoming vehicle is captured at the right side of the preceding vehicle, and as has been described above, there may occur an occasion where the light of the headlamp of the oncoming vehicle is captured integrally with the light of the tail lamp of the preceding vehicle. Due to this, in detecting an area where the right-side tail lamp of the preceding vehicle is captured the area where the right-side tail lamp is captured can appropriately be detected by ending the detection of the area in which the right-side tail lamp is captured and which expands vertically on the image due to the light of the headlamp of the oncoming vehicle by making use of the information on the area where the left-side tail lamp of the preceding vehicle is captured an the appropriate point in time. the area where the right-side tail lamp is captured can appropriately be detected. Because of this, the advantages of the respective aspects of the invention described above are exhibited appropriately.

According to the fifth aspect of the invention, when the sampling cycle is short, in this time's sampling cycle, it is highly possible that the tail lamps are captured in the areas which lie near the areas where the tail lamps were captured in the immediately preceding sample cycle or in the past sampling cycles which occurred not long before the current sampling cycle. Due to this, it is possible to detect the areas where the tail lamps are captured in an ensured fashion and efficiently, by setting the pixel lines which constitute the reference for detection to the pixel lines which include the pixels which were detected as the central points of the tail lamps in the past to start scanning therefrom. Therefore, the advantages of the respective aspects of the invention described above are exhibited more accurately.

According to the sixth aspect of the invention, when the pixel which was detected as the central point of the tail lamp in the past also has the very high luminance in the image captured in this time's sampling cycle, thereby it is possible to detect the area where the tail lamp is captured efficiently and in an ensured fashion, by judging the pixel where the tail lamp is captured, only the pixel area which includes the pixel is detected, and no other pixel areas having the high luminance are detected any more. Therefore, the advantages of the respective aspect of the invention are exhibited more accurately.

According to the seventh aspect of the invention, since the distance in the actual space between the left- and right-side tail lamps of the preceding vehicle is constant and the left- and right-side tail lamps are captured substantially in the same position in the vertical direction on the image captured, by performing the detection of one of the tail lamps in the position which lies apart by the lamp-to-lamp distance from the central point of the other opposite tail lamp, the area where the tail lamp is captured can be detected in an ensured fashion, the advantages of the respective aspects of the invention described above are exhibited more accurately.

According to the eighth aspect of the invention, in many cases, the left- and right-side tail lamps of the preceding vehicle are positioned in positions which lie apart on the order of one eighth or one sixth of the vehicle width from the left and right side edges of the preceding vehicle, respectively. Due to this, the area where the tail lamp is captured can be detected in an ensured fashion by performing the detection of the tail lamps in similar positions on the image captured. Therefore, the advantages of the respective aspects of the invention described above are exhibited more accurately.

According to the ninth aspect of the invention, when the preceding vehicle captured in the image is detected by surrounding it by the rectangular frame line and, for example, a plurality of pixel areas having the high luminance are detected on the pixel which extends vertically within the frame line, it is possible to detect the area where the tail lamp is captured in an ensured fashion by detecting the highly bright pixel area having the largest number of pixels as the area where the tail lamp is captured. Therefore, the advantages of the respective aspects of the invention described above are exhibited more accurately.

According to the tenth aspect of the invention, when the road surface is wet due to rain, there may occur an occasion where the reflected light of the tail lamps is captured on a lower side of the preceding vehicle in the image captured. In addition, when the preceding vehicle captured in the image is detected by surrounding it by the rectangular frame line, there may occur an occasion where the reflected light includes the lower edge of the frame line to have a comparatively large area. As this occurs, in the ninth aspect of the invention, when the highly bright area having the largest number of pixels which is detected on the pixel line includes the lower edge of the frame line, the highly bright pixel area having the largest number of pixels is eliminated even though the pixel area has the largest number of pixels, and the highly bright pixel area is detected for preference which lies nearer the central point of the tail lamp which was detected in the past or the center between the upper and lower edges of the frame line. Thereby it is possible to detect the area where the tail lamp is captured in an ensured fashion. Therefore, the advantages of the respective aspects of the invention described above are exhibited more accurately.

According to the eleventh aspect of the invention, when the preceding vehicle is detected, for example, by surrounding it by the rectangular frame line, in the event that only one of the areas where the tail lamps are captured can be detected, there may occur an occasion where the preceding vehicle is detected in such a state that only about half of the preceding vehicle is surrounded by the frame line. As this occurs, the frame line can be extended by estimating the position of the other area on the image based on the distance between the pixels which constitute the centers of the areas where the left- and right-side tail lamps are captured.

By restoring the area where the preceding vehicle is captured in the image to the normal state in the way described above, in addition to the advantages of the respective aspects of the invention described above, the preceding vehicle can be detected in an ensured fashion, and at the same time, since the preceding vehicle is judged for certain as running in front of the subject vehicle as long as one of the areas where the tail lamps are captured is detected, the extending operation like this is made to continue as long as the area where the tail lamp is captured continues to be detected, so as to restore the preceding vehicle captured area to its normal state. Therefore, the detecting stability of the preceding vehicle can be maintained or increased, and it is possible to trace the preceding vehicle in an ensured fashion.

According to the twelfth aspect of the invention, for example, when it rains hard, there may occur an occasion where the distance measuring unit calculates an abnormal distance to the preceding vehicle or cannot detect the distance to the preceding vehicle. As this occurs, to cope therewith, it is configured such that the distance measured by the distance measuring unit can be modified or corrected by calculating a distance to the preceding vehicle based on the distance between the pixels which constitute the central points of the left- and right-side tail lamps detected.

By adopting the configuration above, in addition to the advantages of the respective aspects of the invention described above, even though the distance measuring unit calculates the abnormal distance to the preceding vehicle or cannot detect the distance to the preceding vehicle, the abnormal distance, for example, can be modified or corrected by calculating a distance of a normal value between the subject vehicle and the preceding vehicle or a distance close to the normal value. In addition, by accurately grasp the positional relationship of the subject vehicle relative to the preceding vehicle, it is possible to maintain or increase the detecting stability of the preceding vehicle by tracing the preceding vehicle accurately without losing the same from the field of view.

According to the thirteenth aspect of the invention, the stereo matching operation is performed on the edge portions of the respective areas where the tail lamps or the preceding vehicle are captured in the image which is captured by the plurality of image capture. Therefore, a distance between the subject vehicle and the preceding vehicle is calculated based on the information obtained on the disparity.

In addition to the described above, for example, the distance between the subject vehicle and the preceding vehicle can be measured accurately by performing the stereo matching operation on the edge portion of the tail lamp area having the high luminance which is clearly discriminated from surrounding areas having low luminance even when the distance between the subject vehicle and the preceding vehicle cannot be calculated based on the stereo matching operation on the edge portion of a vehicle body of the preceding vehicle due to the edge portion of the vehicle body being unable to be captured on the dark road surface during driving at night, or, although the distance can be calculated, the distance so calculated lacks reliability. In addition, since the reliability of the distance measured between the subject vehicle and the preceding vehicle can be increased and the positional relationship of the subject vehicle relative to the preceding vehicle can be grasped accurately, it is possible to maintain or increase the detecting stability of the preceding vehicle by tracing the preceding vehicle accurately without losing the same from the field of view.

According to the fourteenth aspect of the invention, in addition to the advantages of the respective aspects of the invention described above, it is possible to identify the turning on and off of the brake lamp by identifying the increase and decrease in the number of pixels which belong to the areas where the tail lamps of the preceding vehicle are captured, and a safety driving mechanism based on an appropriate automatic steering or automatic brake control such as a collision preventive mechanism can be activated in which a collision against the preceding vehicle is prevented based on the information obtained in the way described above. In addition, it is possible to accurately grasp the behaviors of the preceding vehicle, so as to trace the preceding vehicle accurately, thereby making it possible to maintain or increase the detecting stability of the preceding vehicle.

According to the fifteenth aspect of the invention, for example, when a three-dimensional object exists far ahead of the subject vehicle, although the vehicle is steered automatically in such a way as to pass by the three-dimensional object in case the object constitutes an obstacle to the vehicle, in the event that the three-dimensional object lying ahead of the subject vehicle is a preceding vehicle which is being stopped, the vehicle has to automatically be controlled to brake so as not to pass by the preceding vehicle but to stop behind the same. Since the automatic controls performed on the subject vehicle differ in the way described above depending upon the types of three-dimensional objects lying thereahead, the determination of types of three-dimensional objects becomes very important.

In this case, when two left and right highly bright areas of the three-dimensional object detected ahead of the subject vehicle satisfy the conditions described in the fifteenth aspect of the invention, the three-dimensional object is determined as a vehicle, whereby in addition to the advantages of the respective aspects of the invention described above, the type of the three-dimensional object lying ahead of the subject vehicle can be determined accurately and in case the three-dimensional object is a vehicle, for example, the safety driving performance of the subject vehicle can be increased by activating the automatic brake control well before the vehicle lying thereahead or changing to increase a detecting distance of a preceding vehicle which is set in front of the subject vehicle.

Other aspects and advantages of the invention will be apparent from the following description and the appended claims.

BRIEF DESCRIPTION OF THE DRAWINGS

FIG. 19 is Diagrams illustrating a relationship between the length of a current tail lamp area candidate and a maximum value of the length, of which FIG. 19A shows a situation where the current length is equal to the maximum value, FIG. 19B shows a situation where the current length is longer than a constant number of times the maximum value, and FIG. 19C shows a situation where the current length is shorter than the constant number of times the maximum value, FIG. 20 is Diagrams illustrating highly bright areas which indicate light of the tail lamps which are captured in the image, of which FIG. 20A shows a situation where the tail lamp is a rectangular shape, FIG. 20B shows a situation where the tail lamp is a circular shape, and FIG. 20C shows a situation where the tail lamp is captured in the rain, FIG. 32 is a graph showing an increase in the total pixel numbers in the tail lamp area.

DESCRIPTION OF THE PREFERRED EMBODIMENTS

A preceding vehicle detection system (apparatus or device) is described which can detect tail lamps of a preceding vehicle with good detection stability and in an ensured fashion according to an exemplary embodiment is described hereinafter.

Note that while in this embodiment, a mode is illustrated in which stereoscopic image capturing is implemented by employing two cameras which function as an image capture device or unit for capturing an image of surroundings in front of a subject vehicle, the image capture device can be configured, for example, to include a single camera. In addition, a preceding vehicle detection unit may be in any form, provided that it can detect a preceding vehicle from an image captured by the image capture device, and hence, the configuration of the preceding vehicle detection unit is not limited to a configuration which is described in the embodiment of the invention hereinafter.

Figure 1:
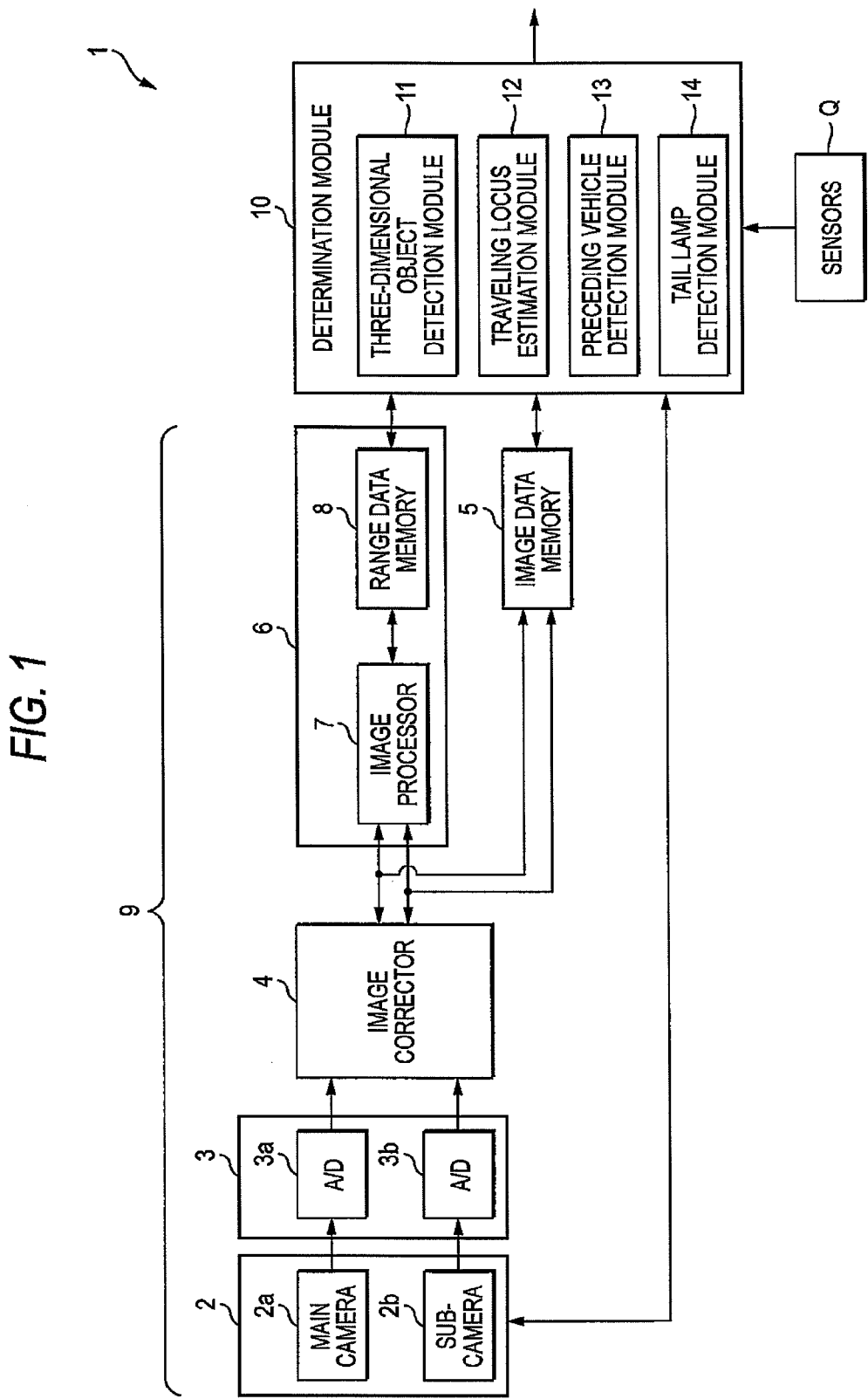
FIG. 1 is block diagram showing a configuration of a preceding vehicle detection system according to an embodiment of the invention.

As is shown in FIG. 1, a preceding vehicle detection system 1 is configured to include mainly a positional information collecting unit 9 which is made up of an image capture module 2, a conversion module 3, an image processing module 6 and the like, and a detection module (detection unit) 10 which includes a preceding vehicle detection module (preceding vehicle detection unit 13) and a tail lamp detection module (tail lamp detection unit) 14.

Note that the configuration from the image capture module 2 to a three-dimensional object detection module (three-dimensional object detection unit) 11 of the detection unit 10 is described in detail in published documents of the Japanese unexamined patent applications that had been filed by the applicant of this patent application which include JP-A-5-114099, JP-A-5-265547, JP-A-6-266828, JP-A-10-283461, JP-A-10-283477, and JP-A-2006-72495, and therefore, the published documents raised above should be referred to for detail description of the configuration. The configuration is briefly described hereafter.

In this embodiment, the image capture module 2 is a stereo camera made up of a pair of a main camera 2a and a sub-camera 2b which are synchronized with each other, which each incorporates an image sensor such as a CCD or a CMOS sensor and which are mounted, for example, in the vicinity of an inside rearview mirror in such a manner as to be spaced apart in a transverse direction of a subject vehicle, and is configured to capture at a predetermined sampling cycle an image of a landscape including the road lying ahead of the vehicle so as to output a pair of images. Of the pair of cameras, the main camera 2a is located closer to the driver and is made to capture, for example, a reference image T shown in FIG. 2.

In addition, as is described later, tail lamps of a preceding vehicle are made to be captured based on the reference image T. Additionally, an image captured by the sub-camera 2b is referred to as a comparison image.

Image data outputted from the main camera 2a and the sub-camera 2b is converted from analog images to digital images which are each made up of pixels each having a luminance of a predetermined luminance level expressed, for example, based on a gray scale of 256 gray or luminance levels by A/D converters 3a, 3b which make up the conversion module 3, the digital images so converted are subjected to image correction in an image correction module 4 to remove deviation and noise, and the resulting images so corrected are then stored in an image data memory 5 and at the same time are transmitted to the detection unit 10.

In an image processor 7 in the image processing module 6, a stereo matching operation and a filtering operation are performed on the image data of the reference image T and the comparison image so as to calculate a disparity dp which corresponds to a distance in actual space. Hereinafter, an image to which disparity dp is allocated is referred to as a range image. Information on the disparity dp which is calculated in this way, that is, the range image is stored in a range data memory 8 of the image processing module 6.

Points (X, Y, Z) in actual space which results when assuming that the disparity dp, a point (i, j) on the range image and a point on the road surface which lies directly below a center between the pair of cameras 2a, 2b are original points and that a vehicle-width or transverse direction of the subject vehicle is an X-axis direction, a vehicle-height or vertical direction is a Y-axis direction and a vehicle-length or longitudinal direction is a Z-axis direction are associated uniformly by coordinate transformations which are expressed by Equations (1) to (3) below. In addition, in the respective equations below, CD is the interval between the pair of cameras, PW is a pixel of the angle view, CH is the mounting height of the pair of cameras, IV and JV are an i coordinate and a j coordinate on the range image of a point at infinity forward of the subject vehicle and DP is a vanishing point disparity.

$$X = CD/2 + Z \times PW \times (i - IV) \quad (1)$$

$$Y = CH + Z \times PW \times (j - IV) \quad (2)$$

$$Z = CD/(PW \times (dp - DP)) \quad (3)$$

The positional information collecting unit 9 for measuring a distance Z from the subject vehicle to a three-dimensional object which lies within a predetermined range ahead of the subject vehicle, that is, the disparity dp which is uniformly associated with the distance Z by Equation (3) above is made up of the constituent modules which arranged from the image capture unit 2 to the image processing module 6 which includes the image processor 7 and the range data memory 8, and the positional information collecting unit 9 corresponds to the distance detection unit for calculating the distance Z between the subject vehicle and the preceding vehicle.

Note that the distance detection unit may be in any form as long as it can calculate or measure the distance Z between the subject vehicle and the preceding vehicle, and in addition to the configuration described in the embodiment, the distance detection unit can be made up, for example, of a radar unit for emitting a laser beam or infrared light ahead of the subject vehicle so as to measure the distance Z to the object based on information on its reflected light, and as to the method for detecting the distance, there is specified no particular method.

The detection unit 10 is made up of a microcomputer in which a CPU, a ROM, a RAM, and an input/output interface are connected to a bus. In addition, sensors Q such as a vehicle speed sensor, a yaw-rate sensor, and a steering sensor for measuring a turning or steering angle of a steering wheel are connected to the detection unit 10. In addition, in place of the yaw-rate sensor, a device can be used which estimates a yaw-rate from the vehicle speed of the subject vehicle.

As is shown in FIG. 1, the detection unit 10 includes the object detection module 11, a traveling locus estimation module 12, the preceding vehicle detection module 13 and the tail lamp detection module 14, and furthermore, the detection unit 10 includes a memory, not shown. In addition, necessary data is made to be inputted into the respective modules of the detection unit 10 from the sensors Q.

The three-dimensional object detection module 11 is configured based on an outside-the-vehicle monitoring system which is described in JP-A-10-283461. The patent publications is to be referred to for the detailed description of the three-dimensional object detection module 11. Hereinafter, the same module is briefly described.

The three-dimensional object detection module 11 is made to perform a three-dimensional object detecting operation for detecting a three-dimensional object by gathering information on positions which are adjacent to each other into groups based on positional information of three-dimensional objects, that is, disparities dp and classifying a disparity dp in each group into a subgroup which is substantially parallel to the transverse direction of the subject vehicle and a subgroup which is substantially parallel to the traveling direction of the subject vehicle so as to detect a three-dimensional object.

Specifically, the three-dimensional object detection module 11 reads out the range image from the range data memory 8 and divides the range image into strip-like portions which extend in the vertical direction with predetermined pixel widths. Then, the object detection module 11 converts disparities which belongs to each strip-like portion into distances Z according to Equation (3) above, prepares a histogram for a distance of the distances Z so converted which is positioned as existing above the road surface and regards a distance to a section having a maximum gray or luminance level as a distance to a three-dimensional object in the strip-like portion. The object detection module 11 performs this operation on the whole portions. Hereinafter, the distance which represents each portion is regarded as the distance Z.

Figure 2:
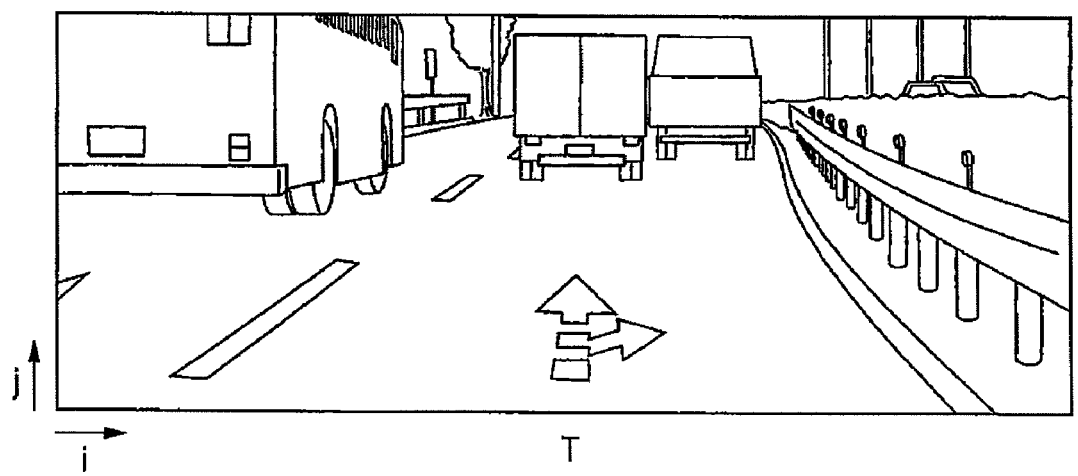
FIG. 2 is a diagram showing an example of a reference image.
Figure 3:
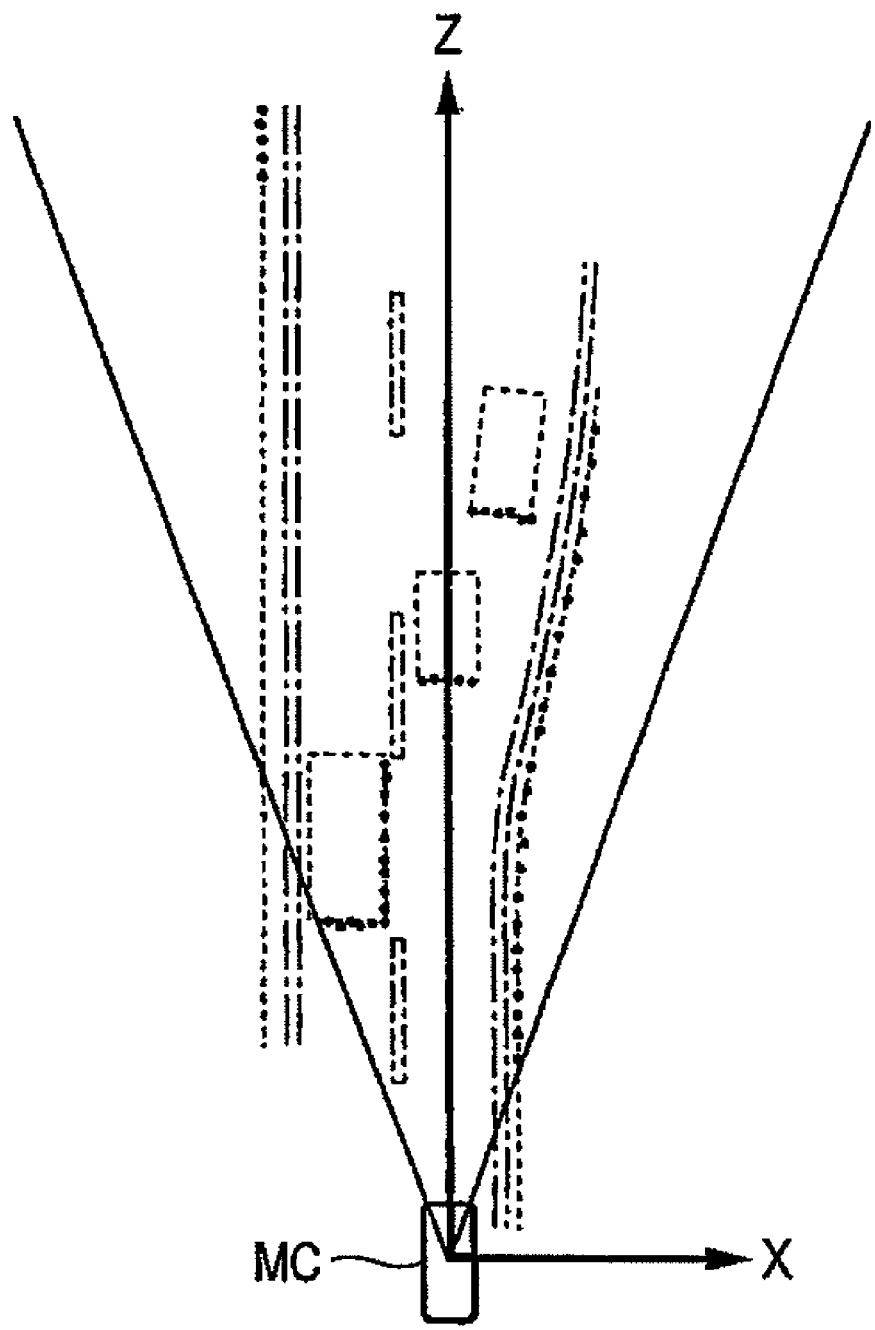
FIG. 3 is a diagram representing points plotted to indicate individually distances to respective portions in an actual space.

For example, when calculating the distance Z for a range image prepared from the reference image T shown in FIG. 2 and plotting distances Z so calculated for the respective portions on an actual space, the distances Z are plotted as having a slight variation in portions of three-dimensional objects lying ahead of the subject vehicle which correspond to portions facing the subject vehicle MC as shown in FIG. 3.

Figure 4:
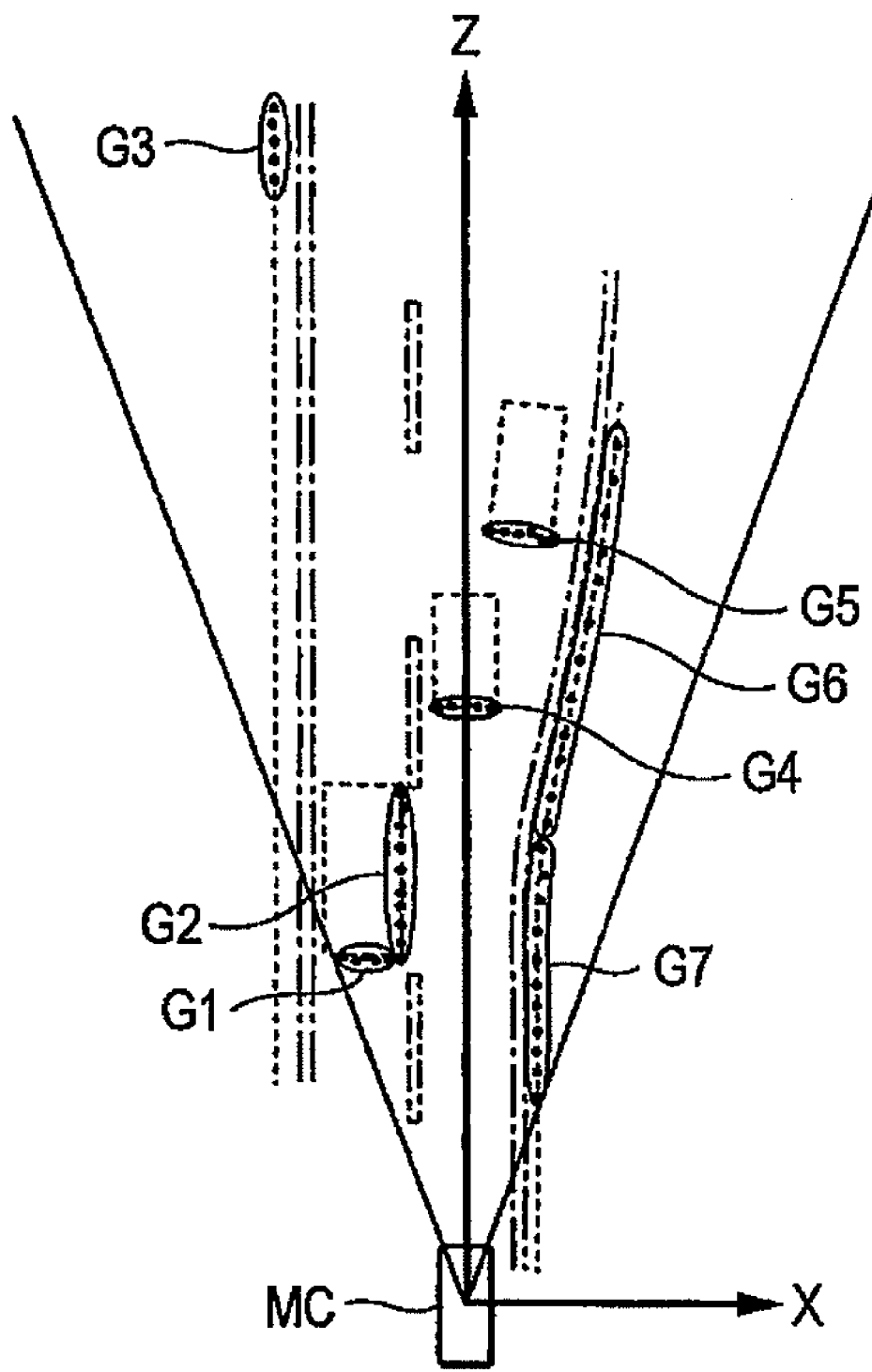
FIG. 4 is a diagram representing respective groups when the points in FIG. 3 are grouped.
Figure 5:
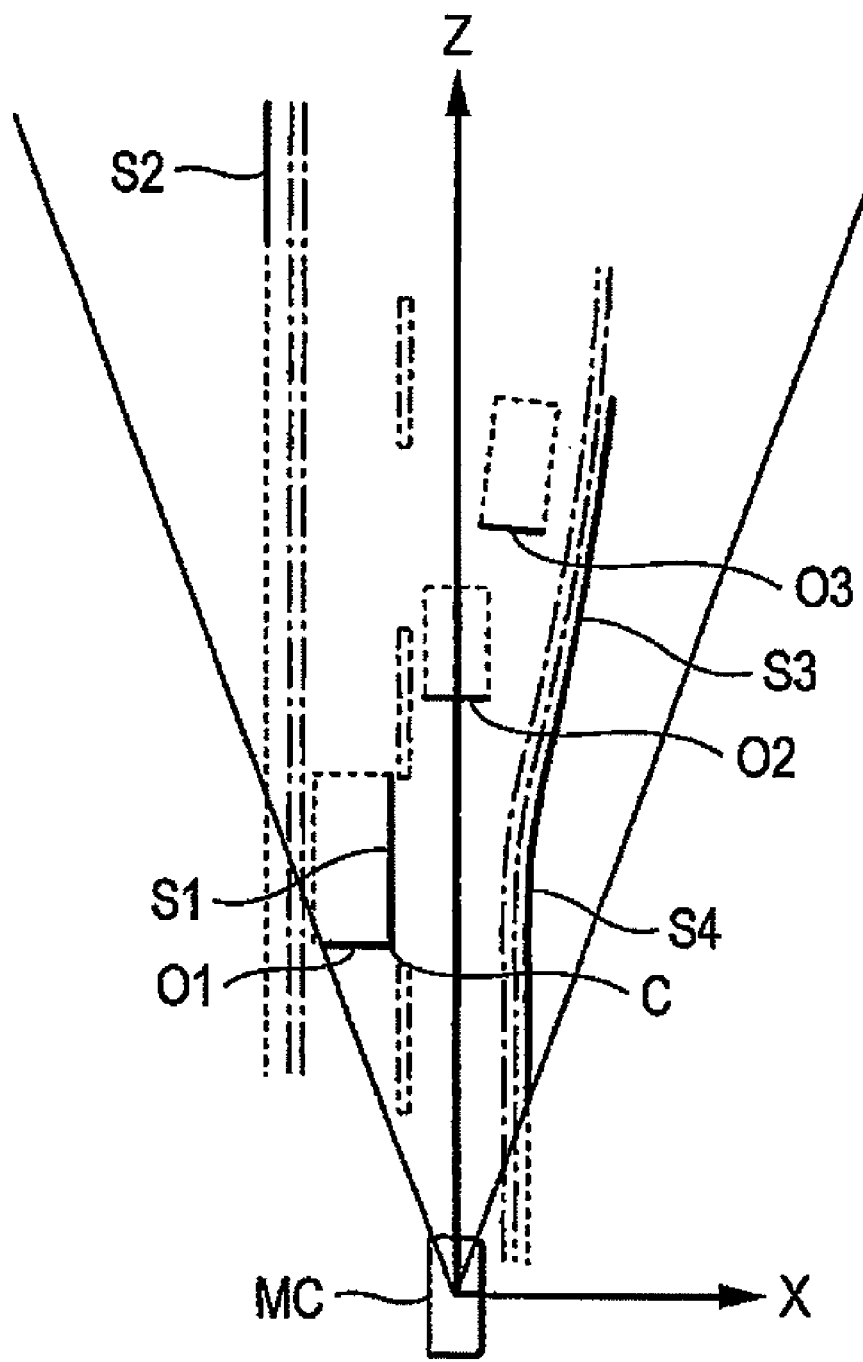
FIG. 5 is a diagram representing respective subgroups which are formed by classifying the respective groups in FIG. 4.

The three-dimensional object detection module 11 gathers points of the points so plotted which lie adjacent to each other into groups G1 to G7 based on the distance between the points lying close to each other and directionality thereof as shown in FIG. 4 and labels for classification subgroups of the respective groups which are each made up of points which are aligned substantially parallel to the transverse direction of the subject vehicle MC, that is, the X-axis direction "objects" O1 to O3. And subgroups which are each made up of points which are aligned substantially parallel to the traveling direction of the subject vehicle MC, that is, the z-axis direction "side walls" S1 to S4. In addition, the object detection module 11 labels an intersection point between the "object" and the "side wall" of the three-dimensional object a corner point C.

Figure 6:
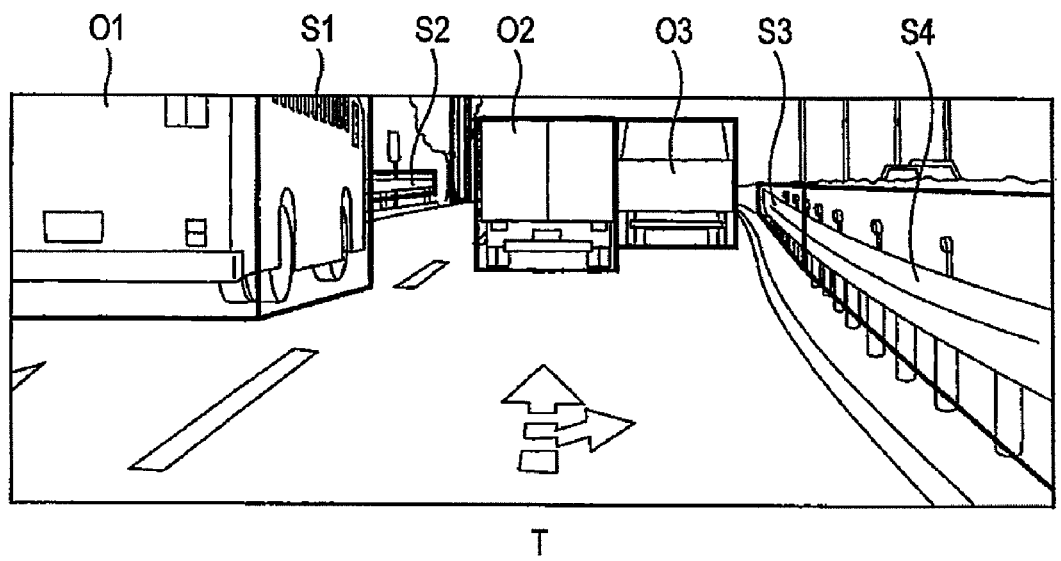
FIG. 6 is a diagram showing a three-dimensional object indicated by a rectangular frame line on the reference image.

In this way, the object detection module 11 detects the "object O1, corner point C, side wall S1," the "side wall S2," the "object O2," the "object O3," the "side wall S3," and the "side wall S4" as three-dimensional objects, respectively. In addition, as is shown in FIG. 6, the object detection module 11 detects the three-dimensional objects in the reference image T in such a manner as to surround them by rectangular frame lines.

The object detection module 11 stores information on the three-dimensional objects which are detected in the way described above and coordinates of end points of the respective subgroups and coordinates of apexes of the respective frame lines on the reference image T and to output them as required.

The traveling locus estimation module 12 estimates a traveling locus of the subject vehicle based on the behaviors of the subject vehicle. Specifically, the traveling locus estimation module 12 calculates a turning curvature Cua of the subject vehicle based on behaviors of the subject vehicle such as vehicle speed V, yaw-rate γ and steering angle δ of the steering wheel of the subject vehicle which are inputted from the sensors Q such as the vehicle speed sensor, the yaw-rate sensor and the steering angle sensor and calculate and estimate a traveling locus Lest of the subject vehicle MC based on the turning curvature Cua so calculated, as is shown on the actual space in FIG. 7.

By employing, for example, the vehicle speed V and the yaw rate γ, the turning curvature Cua can be calculated according to the following equation;

$$Cua=\gamma/V \quad (4)$$

In addition, by employing the vehicle speed V and the steering angle δ, the turning curvature Cua can be calculated according to the following equations;

$$Re=(1+Asf\cdot V^2)\cdot(Lwb/\delta) \quad (5)$$

$$Cua=1/Re \quad (6)$$

where, Re is a turning radius, Asf is a stability factor of the vehicle and Lw is a wheelbase.

Figure 7:
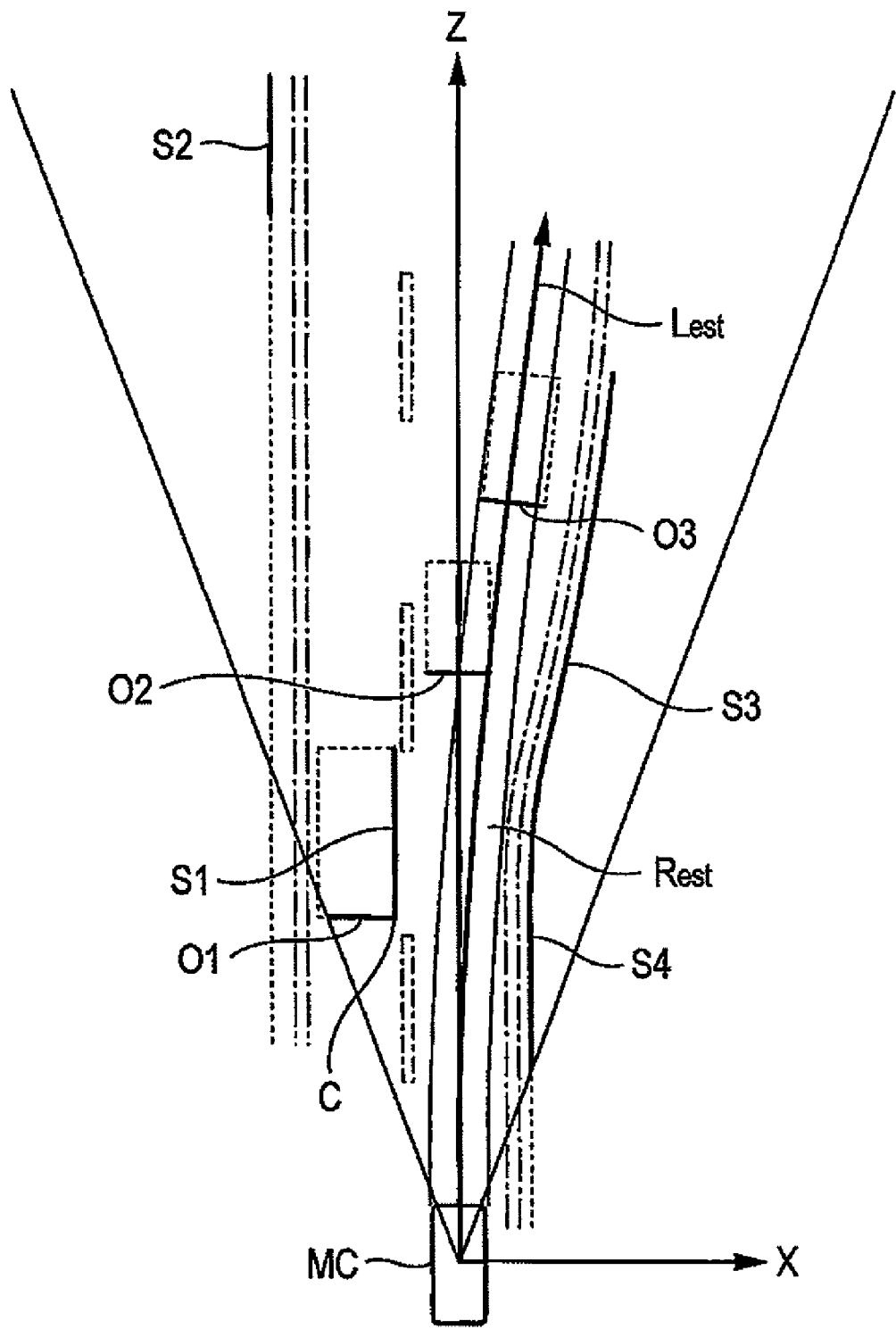
FIG. 7 is a diagram illustrating a traveling locus and a traveling course of a subject vehicle.

In addition, in this embodiment, the traveling locus estimation module 12 grasps an area equivalent to the vehicle-width of the subject vehicle which is centered at the traveling locus Lest as is shown in FIG. 7 as a traveling course Rest of the subject vehicle. The traveling locus estimation module 12 preserves information on the traveling locus Lest and the traveling course Rest of the subject vehicle MC which were so estimated in the memory.

The preceding vehicle detection module 13 is designed to detect the three-dimensional object which is closest to the subject vehicle as a preceding vehicle, and is made to detect as a preceding vehicle among the three-dimensional objects lying on the traveling course Rest of the subject vehicle which are grasped by the traveling locus estimation module 12 as the three-dimensional object which lies closes to the subject vehicle, that is, the object O2 in the example described above.

Furthermore, the preceding vehicle detection module 13 reads out the information on the preceding vehicle which was detected previously from the memory and calculates a probability that the preceding vehicle so detected previously and the three-dimensional object detected this time are the same three-dimensional object based on the positional relationship between the preceding vehicle so detected previously and the three-dimensional object detected this time as being closest to the subject vehicle and the traveling speed. In the event that the probability so calculated is equal to or more than a preset threshold value, the object detection module 11 labels the three-dimensional object detected this time a preceding vehicle to thereby detect the preceding vehicle and updates the information on the preceding vehicle with the information on the three-dimensional object detected this time to continuously register the preceding vehicle information in the memory. Thus, the object detection module 11 traces the preceding vehicle while updating the information thereon.

The preceding vehicle detection module 13 also calculates a distance between plots lying at both ends of the group G4 of the groups G1 to G7 shown in FIG. 4 which corresponds to the preceding vehicle O2 so as to store it in the memory as a vehicle width car_width of the preceding vehicle O2. In addition, it is possible to configure such that a transverse width of the rectangular frame line which indicates the preceding vehicle O2 shown in FIG. 6 is calculated as the vehicle width car_width of the preceding vehicle O2.

In this embodiment, the tail lamp detection module 14 is made to detect areas where the tail lamps of the preceding vehicle are captured from the image zone which is indicated by the frame line on the reference image T and in which the preceding vehicle is captured (hereinafter, referred to as tail lamp areas).

Figure 8:
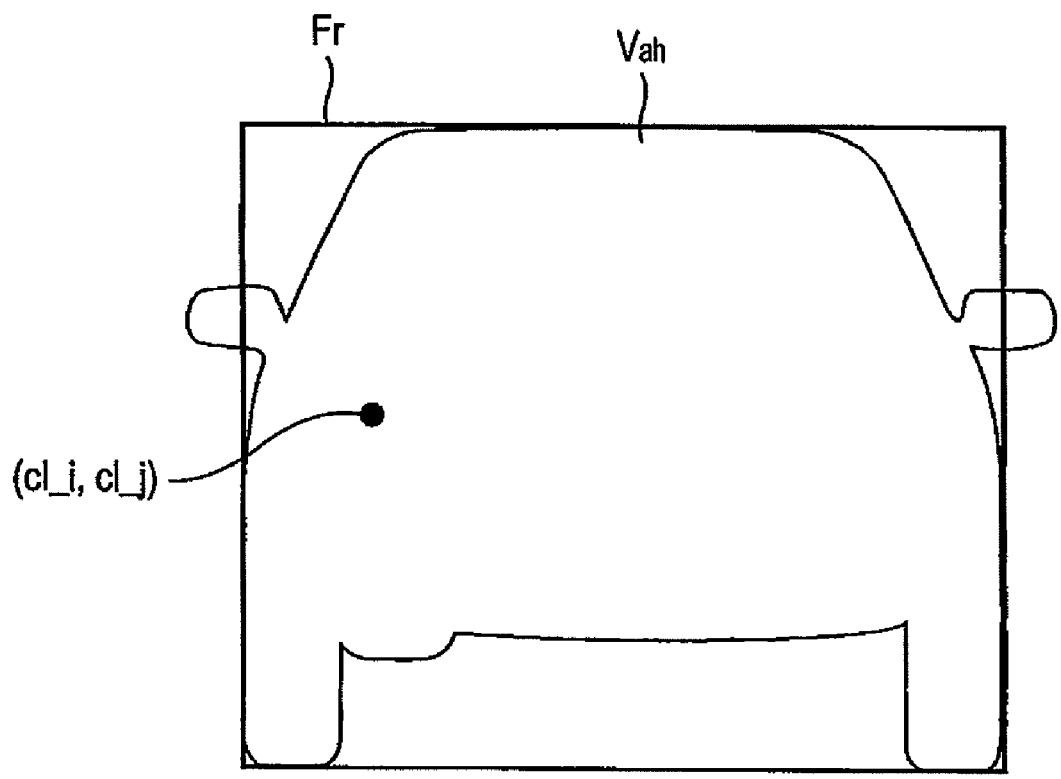
FIG. 8 is a diagram illustrating the preceding vehicle indicated by the frame line and a lamp detection point.

Hereinafter, a tail lamp detection operation procedure in the tail lamp detection module 14 of the embodiment is described. In addition, in the following description, a case is described in which a preceding vehicle Vah as is shown on a reference image shown in FIG. 8 is detected and a rectangular frame line Fr is set.

Figure 9:
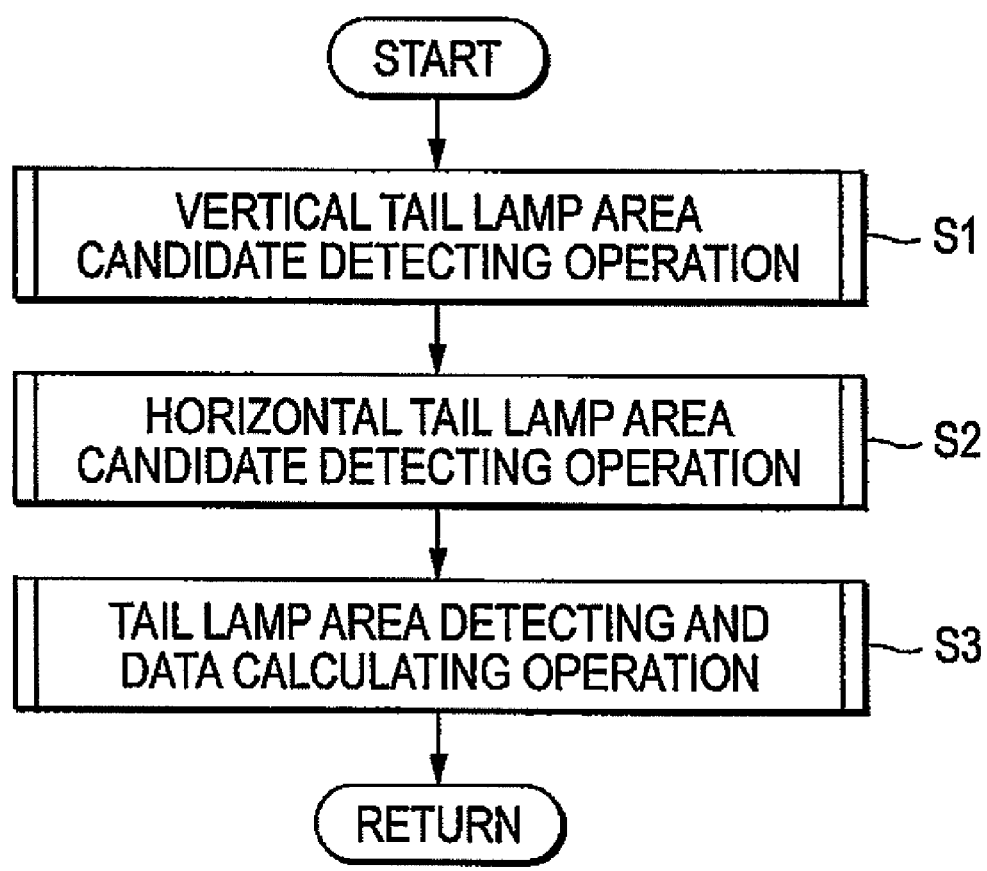
FIG. 9 is a basic flowchart showing a procedure of a tail lamp area detecting operation.

The tail lamp area detection operation is performed according to a basic flowchart shown in FIG. 9. The tail lamp area detection operation is performed in such an order that firstly, a tail lamp area candidate detecting operation is performed in a vertical direction of the reference image (step S1), following this, a tail lamp area candidate detecting operation is performed in a horizontal direction (step S2), and finally, a tail lamp area detecting and data calculating operation is performed (step S3).

Here, the tail lamp area candidate is a pixel area in which the tail lamp of the preceding vehicle is captured and which constitutes a pixel area which is determined as the tail lamp area at a stage where the tail lamp is captured there in as a result of the tail lamp area detecting and data calculating operation (step S3).

In addition, in the tail lamp area candidate detecting operations in the vertical direction and the horizontal direction (steps S1, S2), the detection is implemented independently for the left and right tail lamp area candidates. In the following description, although a detecting operation for the left-side tail lamp area candidate is mainly described, a detecting operation for the right-side tail lamp area candidate is also implemented in a similar way at the same time that the detecting operation is implemented for the left-side tail lamp area candidate.

[Vertical Detecting Operation for Tail Lamp Area Candidate]

The vertical detecting operation for the tail lamp area candidate (step S1) is an operation in which a vertically extending pixel line Pls is found out which constitutes a reference for detection of the tail lamp area within the image area defined by the frame line Fr in the reference image T where the preceding vehicle is captured and a pixel area is found out in the pixel line pls which is highly possible to constitute the tail lamp area. This detecting operation is performed according to a procedure illustrated by a flowchart shown in FIG. 10.

In the vertical detecting operation for the tail lamp area candidate, firstly, the pixel (cl_i, cl_j) on the reference image which was detected as the central point of the tail lamp in the past sampling cycle is read out from the memory (hereinafter, referred to as a lamp detection point (cl_i, cl_j). Refer to FIG. 8.).

Figure 10:
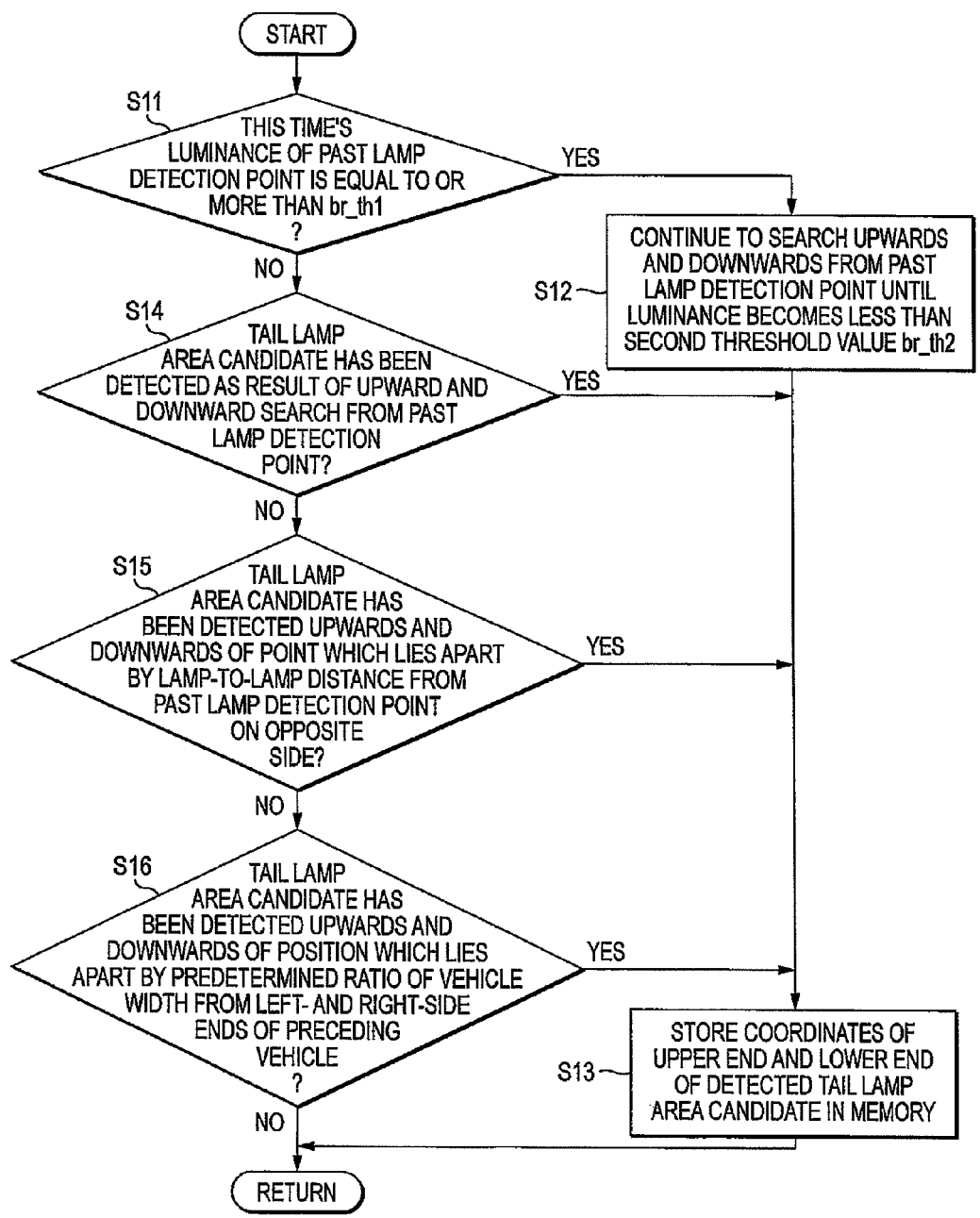
FIG. 10 is a flowchart showing a procedure of a vertical tail lamp area candidate detecting operation.

The past sampling cycle is the last sampling cycle during which the lamp detection point (cl_i, cl_j) was detected. In addition, in the event that there exists no past lamp detection point in the memory, determinations at step S11 and step S14 in the flowchart shown in FIG. 10 are skipped, and the operation flow starts from step S15.

When the past lamp detection point (cl_i, cl_j) is read out, it is determined whether or not a luminance plij of the past lamp detection point (cl_i, cl_j) in this time's sampling cycle is equal to or more than a first luminance threshold value br_th1 which is preset (step S11).

Here, the first luminance threshold value br_th1 is set to a luminance value of 250, which is high on a luminance scale which is made up of 256 luminance levels from 0 to 255, and a second luminance threshold value br_th2, which is described later, is set to a lower luminance level than the first luminance threshold value br_th1, for example, a luminance level of 230. These first luminance threshold value br_th1 and the second luminance threshold value br_th2 are set appropriately based on the sensitivity of the image capture unit 2 or a luminance level to be set.

If the this time's luminance plij of the past lamp detection point (cl_i, cl_j) is equal to or more than the first luminance threshold value br_th1 (step S11: YES), it is highly possible that the area which includes the past lamp detection point (cl_i, cl_j) also constitutes a highly bright area which indicates the tail lamp or the tail lamp area in this time's sampling cycle. Due to this, the pixel line pls which constitutes the reference for detection of the tail lamp area candidate is set to a pixel line which includes the past lamp detection point (cl_i, cl_j).

Following this, it is detected how long in the vertical direction the pixel area having the high luminance or the highly bright pixel area extends from the past lamp detection point (cl_i, cl_j). This detection is implemented according to an upward area detecting operation SUB1 and a downward detecting operation SUB2 below, so as to detect the highly bright pixel area as the tail lamp area candidate (step S12).

[Upward Area Detecting Operation SUB1]

Figure 11:
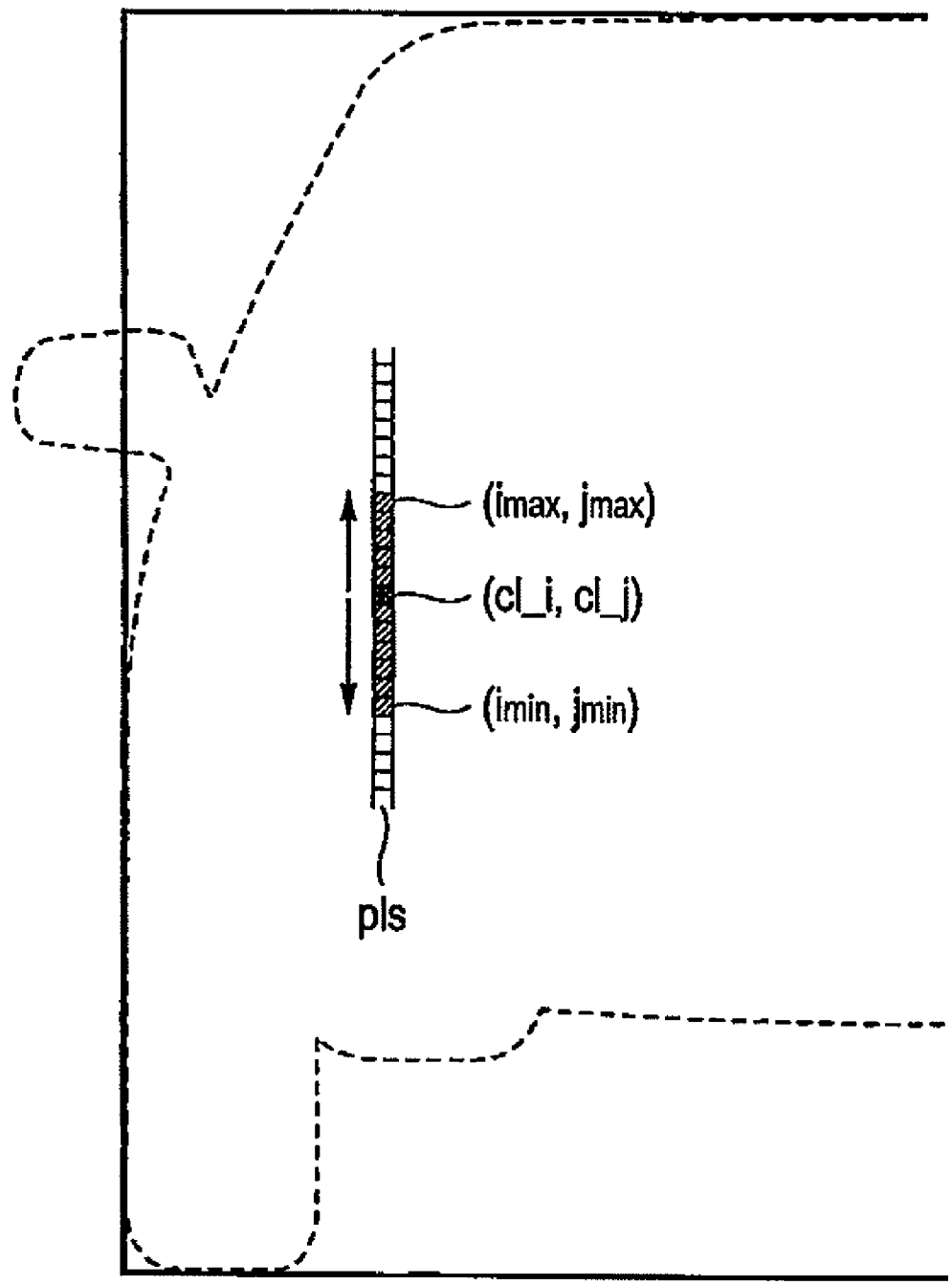
FIG. 11 is a diagram illustrating procedures of an upward area detecting operation and a downward area detecting operation.

In the upward area detecting operation SUB1, as is shown in FIG. 11, pixels on the pixel line having a width equal to the width of a pixel which extends vertically in the reference image and includes the past lamp detection point (cl_i, cl_j) are scanned pixel by pixel upwards from the past lamp detection point (cl_i, cl_j) as a start to seek a luminance plij of each pixel, so as to detect coordinates (imax, jmax) of a pixel immediately preceding to a pixel whose luminance plij becomes less than the second luminance threshold value br_th2.

[Downward Area Detecting Operation SUB2]

In the downward area detecting operation SUB2, in a similar way, pixels on the pixel line which includes the past lamp detection point (cl_i, cl_j) are scanned pixel by pixel downwards from the past lamp detection point (cl_i, cl_j) as a start to seek a luminance plij of each pixel, so as to detect coordinates (imin, jmin) of a pixel immediately preceding to a pixel whose luminance plij becomes less than the second luminance threshold value br_th2.

Then, the coordinates (imax, jmax) of the upper end and the coordinates (imin, jmin) of the lower end of the tail lamp area candidate which were detected in the ways described above are stored in the memory (step S13), and the vertical tail lamp area candidate detecting operation is ended (step S1).

On the other hand, in the determination above (step S11), if the luminance plij of the past lamp detection point (cl_i, cl_j) is determined to be less than the first luminance threshold value br_th1 (step S11: NO), the luminance of the past lamp detection point (cl_i, cl_j) is not that high, and hence, it is possible that the tail lamp area resides in another pixel area. Due to this, the operation flow proceeds to a tail lamp area candidate searching operation.

Firstly, a tail lamp area candidate is searched vertically from the past lamp detection point (cl_i, cl_j) (step S14). Namely, pixels on a pixel line having a width equal to the width of one pixel which includes the past lamp detection point (cl_i, cl_j) are scanned pixel by pixel, and if the tail lamp area candidate is detected, the pixel line pls which constitutes the reference for detection of the tail lamp area candidate is set to this pixel line which includes the past lamp detection point (cl_i, cl_j).

Figure 12:
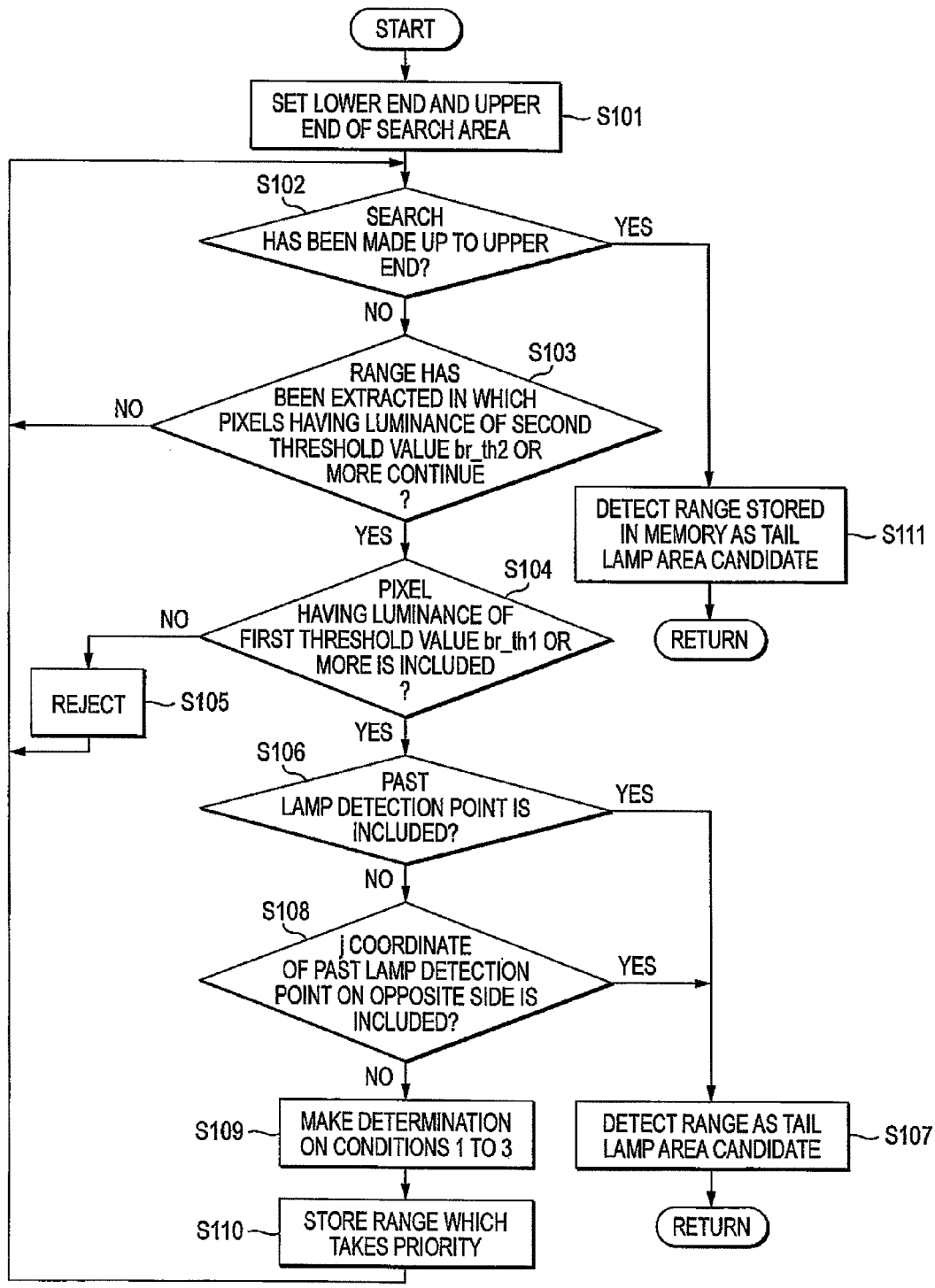
FIG. 12 is a flowchart showing a procedure of the tail lamp area candidate detecting operation.

This searching operation is performed according to a subroutine of a tail lamp area candidate detecting operation SUB3 illustrated by a flowchart shown in FIG. 12. The tail lamp area candidate detecting operation SUB3 shown in FIG. 12 is used commonly in steps S15, S16, which is described later.

[Tail Lamp Area Candidate Detecting Operation SUB3]

Figure 13:
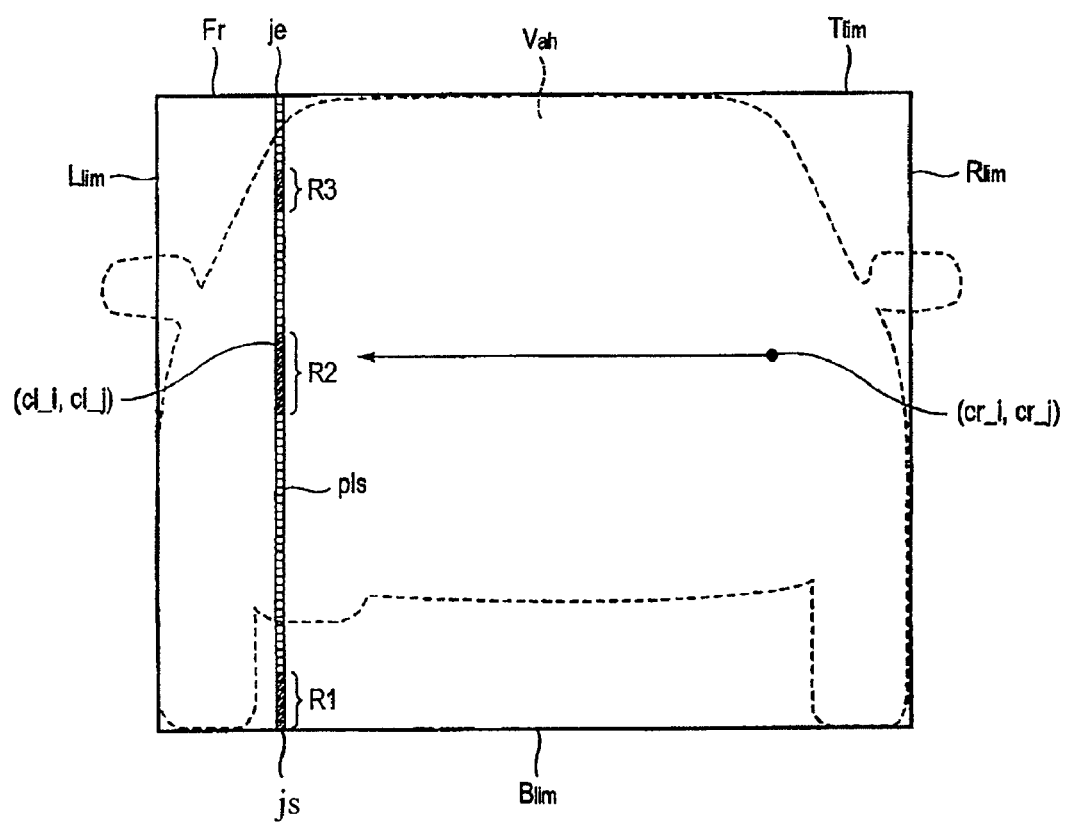
FIG. 13 is a diagram illustrating a process of the tail lamp area candidate detecting operation.

In this tail lamp area candidate detecting operation SUB3, firstly, as is shown in FIG. 13, a j coordinate js at a lower end and a j coordinate je at an upper end of a searching area are set (step S101). In this embodiment, the lower end and upper end of a pixel line to be searched are set to respective j coordinates of a lower or bottom limit line Blim and an upper or top limit line Tlim of the frame line Fr which defines the preceding vehicle Vah.

Then, if the search was started from the lower end js and has not yet reached the upper end je (step S102: NO), pixels on the pixel line are scanned upwards pixel by pixel while determining whether or not the luminance plij of each pixel is equal to or more than the second luminance threshold value br_th2, so as to extract a range where pixels whose luminance is equal to or more than the second luminance threshold value br_th2 exist continuously (step S105), whereby for example, a range R1 shown in FIG. 13 is extracted.

When the range is extracted (step S103: YES), if there exists no highly bright pixel having the luminance plij which is equal to or more than the first threshold value br_th1 in the range so extracted (step S104: NO), the range is rejected (step S105), and the upward searching on the pixel line continues. For example, no pixel having a luminance which is equal to or more than the first threshold value br_th1 is included in the range R1 in FIG. 13, the range R1 is rejected.

If a pixel having the luminance plij which is equal to or more than the first threshold value br_th1 exists in the range so extracted (step S104: YES), following this, whether or not the past lamp detection point (cl_i, cl_j) is included in the range is determined (step S106), and if the past lamp detection point (cl_i, cl_j) is determined to be included in the range (step S106: YES), since it is highly possible that the range is the tail lamp area, the range is detected as a tail lamp area candidate (step S107), and the tail lamp area candidate detecting operation SUB3 is ended.

However, for example, as with the range R1 in FIG. 13, if the range includes the pixel having the luminance which is equal to or more than the first threshold value br_th1 but does not include the past lamp detection point (cl_i, cl_j) (step S106: NO), following this, an opposite side, that is, a right-side lamp detection point (cr_i, cr_j) which was detected in the past sampling cycle is read out from the memory, and whether or not a j coordinate (cr_j) which is the same as the past lamp detection point (cr_i, cr_j) is included in the range is judged (step S108).

Note that as is described later in the tail lamp area detection and data calculating operation (step S3) the past right-side lamp detection point (cr_i, cr_j) is not necessarily such that it was detected in the same sampling cycle as that in which the past left-side lamp detection point (cl_i, cl_j) was detected.

Then, if the same j coordinate cr_j which is the same as the past right-side lamp detection point (cr_i, cr_j) is included in the range (step S108: YES), the range is detected as a tail lamp area candidate (step S107), and the tail lamp area candidate detecting operation SUB3 is ended. This is because the left-side tail lamp is such as to be provided at the same height from the ground as the right-side tail lamp.

In addition, the reason that in the determinations in the steps S106, S108, the tail lamp area candidate detecting operation SUB3 is ended momentarily so as to stop searching up to the upper end of the pixel line is that the ranges detected to be determined as the tail lamp area candidates in the respective determinations are highly possible to be the tail lamp area and hence there is no need to continue the searching any further and that the operation time be shortened.

The range R1 in FIG. 13 includes neither the past lamp detection point (cl_i, cl_j) nor the j coordinate cr_j which is the same as the past right-side lamp detection point (cr_i, cr_j) (step S108: NO). In this case, in this embodiment, the following conditions 1 to 3 are set to let a range which is considered most appropriate as the tail lamp area left for preference, and an upper end coordinate (cl_i, jmax) and a lower end coordinate (cl_i, jmin) of a range that is left for preference are designed to be stored in the memory (step S110).

Condition 1: The range that has already been stored in the memory and the range extracted this time are compared, and the range having more pixels which belong thereto takes priority over the other.

Condition 2: In the event that the numbers of pixels which belong to the respective ranges are the same (a) or although the range detected this time has the smaller pixel number, in the event that the range stored in the memory includes the pixel lying at the lower end js of the pixel line (b), center pixels of the two ranges are compared, and the range whose center point is closer to the past lamp detection point (cl_i, cl_j) or in the event that no past lamp detection point is detected, the range whose center pixel is closer to the center (js+je)/2 between the lower end js and the upper end je of the pixel line takes priority over the other.

Condition 3: In the event that distances between the center pixels of the two ranges and the past lamp detection point (cl_i, cl_j) or the center (js+je)/2 between the lower end js and the upper end je of the pixel line are the same, the range which is positioned lower in the pixel line takes priority over the other.

Figure 14:
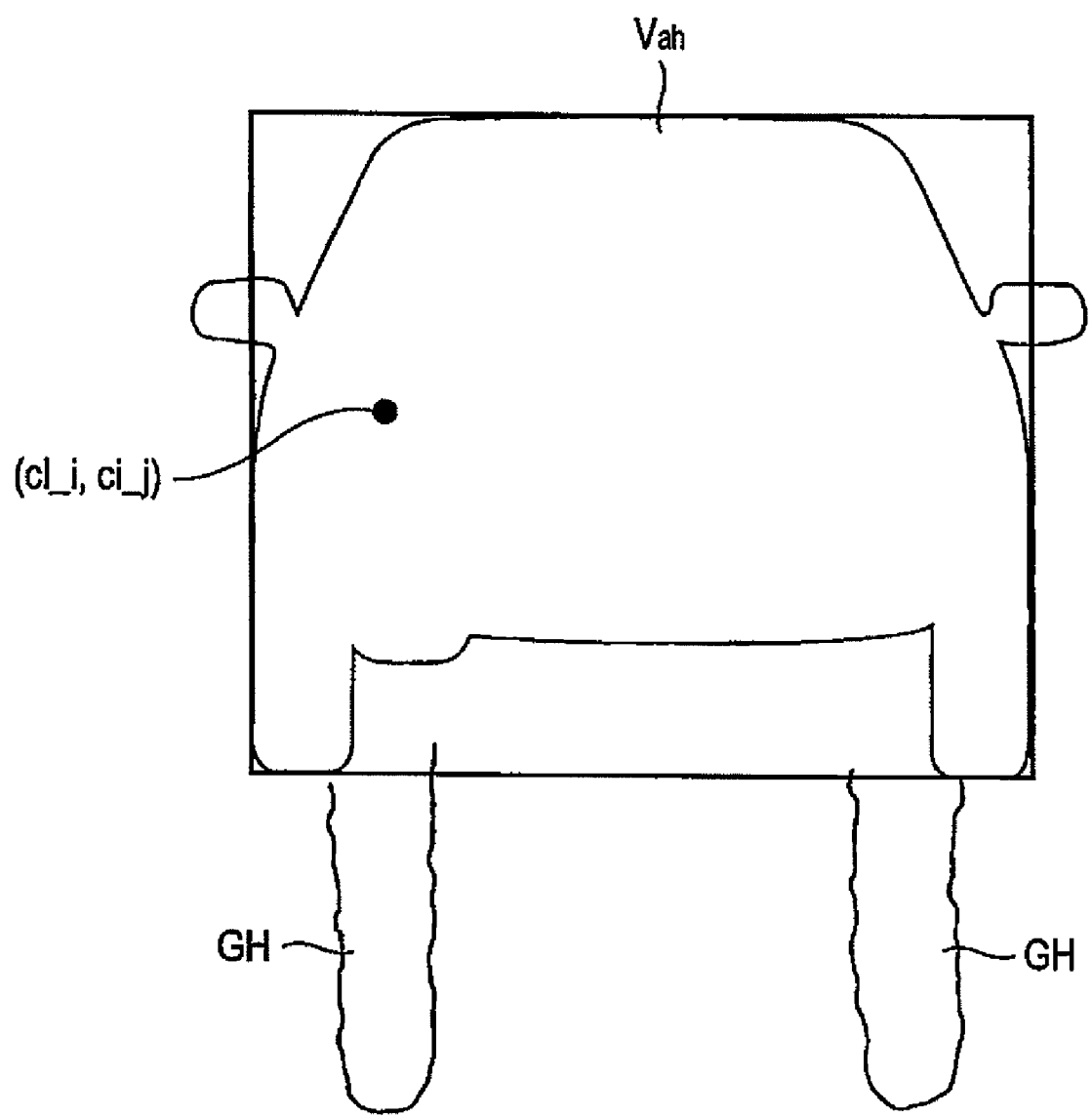
FIG. 14 is a diagram illustrating reflected light of tail lamps which is reflected below the preceding vehicle.

The reason the range which does not include the pixel at the lower end js takes priority over the range which includes the pixel at the lower end ji in Condition 2 above is that when the road surface is wet due to rain, reflected light GH of the tail lamps of the preceding vehicle Vah whose tail lamps are being detected is reflected below the preceding vehicle Vah on the reference image as is shown in FIG. 14 and the areas of the reflected light GH may share a large area within the searching area, which should be eliminated.

Since no other range is stored in the memory at the stage in this time's routine where the range R1 in FIG. 13 is extracted, here, the range R1 automatically takes priority (step S109), and an upper end coordinate (cl_i, jmax) and a lower end coordinate (cl_i, jmin) of the range R1 are stored in the memory (step S110).

Following this, the operation flow returns to the determination at the step S102, and when the detection has not yet reached the upper end je of the pixel line (step S102: No) and a range R2 is detected this time at step S103 (step S103: YES), since the range R2 has a highly bright pixel having the luminance plij which is equal to or more than the first threshold value br_th1 (step S104: YES) and includes the past lamp detection pint (cl_i, cl_j) (step S106: YES), the range R2 is detected as a tail lamp area candidate (step S107), and the tail lamp area candidate detecting operation SUB3 is ended. As this occurs, although the information on the range R1 is stored in the memory, the information on the range R2 is overwritten thereover to be stored in the memory.

However, on the contrary, if the extracted range R2 includes neither the past lamp detection point (cl_i, cl_j) (step S106: NO) nor the j coordinate cr_j which is the same as the past right-side lamp detection point (cr_i, cr_j) (step S108: NO), the range R2 and the range R1 stored in the memory are compared with each other to Conditions 1 to 3 above (step S109), and the upper end coordinate (cl_i, jmax) and the lower end coordinate (cl_i, jimn) of the range which takes priority are overwritten in the memory to be stored (step S110). This may be true with a range R3 in FIG. 13.

Then, the range stored in the memory is detected as a tail lamp area candidate (step S111) at a point in time at which the searching has reached the upper end je of the pixel (step S102: YES), and the tail lamp area candidate detecting operation SUB3 is ended.

If a tail lamp area candidate is detected in the vertical searching (step S14) for the past lamp detection point (cl_i, cl_j) shown in FIG. 10 by the tail lamp area candidate detecting operation SUB3 that has been described above (step S14: YES), the upper end coordinate (cl_i, jmax) and the lower end coordinate (cl_i, jimn) of the tail lamp area candidate so detected are stored in the memory (step S13).

Then, the pixel line pls which constitutes the reference for detection of a tail lamp area candidate is set to the pixel line on the I coordinate cl_i which includes the past lamp detection point (cl_i, cl_j), and the vertical tail lamp area candidate detecting operation (step S1) on the reference image illustrated by the basic flowchart shown in FIG. 9 is ended.

However, if no tail lamp area candidate is detected in the vertical searching (step S14) for the past lamp detection point (cl_i, cl_j), following this, a searching for a left-side tail lamp area candidate is performed by making use of the information on the opposite side, that is, the right-side lamp detection point (cr_i, cr_j) which was detected in the past sampling cycle (step S15).

At step S15, the distance between the central points of the left and right tail lamp areas, that is, the lamp-to-lamp distance which was calculated in the past in the lamp-to-lamp distance calculation (step S41 in FIG. 25), which is described later, and is stored in the memory is read out. Then, a point which lies apart by this lamp-to-lamp distance from the past right-side lamp detection point (cr_i, cr_j) (refer to FIG. 13) is calculated as a temporary "past lamp detection point (cl_i, cl_j), and as with the step S14, a vertical searching is performed according to the tail lamp area candidate detecting operation SUB3 in FIG. 12 so as to search a tail lamp area candidate.

Note that since the lamp-to-lamp distance is calculated as a distance on the actual space, the lamp-to-lamp distance is converted into a distance on the reference image based on Equations (1) and (3) above for use in this operation and operations below as required.

In addition, if the searching is ended and a tail lamp area candidate is detected as a result of the search (step S15: YES), an upper end coordinate (i, jmax) and a lower end coordinate (i, jmin) of the tail lamp area candidate so detected are stored in the memory (step S13), and the pixel line pls which constitutes the reference for detection of a tail lamp area candidate is set to a pixel line which lies apart by the lamp-to-lamp distance from the lamp detection point on the opposite side, the vertical tail lamp area candidate detecting operation on the reference image illustrated by the basic flowchart shown in FIG. 9 being ended.

In addition, if neither of the left nor right lamp detection points was detected in the past sampling cycles, this searching (step S15 in FIG. 10) is skipped.

If no tail lamp area candidate is detected at the step S15, either (step S15: NO), following this, a predetermined ratio to the vehicle width car_width of the preceding vehicle Vah that has been described above is calculated, so as to perform a search for a left-side rail lamp area candidate vertically in a position lying inwards by the predetermined ratio from a left-side edge of the preceding vehicle (step S16).

Specifically, since the tail lamps are situated transversely inwards one eighth to one sixth of the vehicle width from the left and right side edge portions of the preceding vehicle on the rear side thereof, at step S16, the vehicle width car_width of the preceding vehicle Vah which is stored in the memory is read out, and the vehicle width car_width is multiplied by the predetermined ratio which is set, for example, to one eighth. Then, a vertical searching is performed on pixels of a pixel line lying in a position which is situated apart by the predetermined ratio of the vehicle width car_width from the left-side edge Llim of the preceding vehicle Vah according the subroutine which is the tail lamp area candidate detecting operation SUB3 shown in FIG. 12 for searching a tail lamp area candidate.

Then, if the searching is ended and a tail lamp area candidate is detected (step S16: YES), an upper end coordinate (i, jmax) and a lower end coordinate (i, jmin) of the tail lamp area candidate so detected are stored in the memory (step S13), and the pixel line pls which constitutes the reference for detection of a tail lamp area candidate is set to a pixel line which lies apart by the predetermined ratio of the vehicle width car_width from the left-side edge Llim from the preceding vehicle Vah, the vertical tail lamp area candidate detecting operation (step S1) on the reference image illustrated by the basic flowchart shown in FIG. 9 being ended.

In addition, although the search is ended, if no tail lamp area candidate is detected (step S16: NO), information on the tail lamp area candidate is not stored in the memory, and with the reference pixel line pls left not determined, the vertical tail lamp area candidate detecting operation on the reference image (step S1) illustrated by the basic flowchart shown in FIG. 9 is ended.

Note that the predetermined ratio to the vehicle width car_width of the preceding vehicle is not limited to one eighth of the vehicle width car_width which is adopted in this embodiment. In addition, in the event that no tail lamp area candidate can be detected on the pixel line lying in the position which is situated apart one eighth of the vehicle width car_width from the side edge of the preceding vehicle Vah, a tail lamp area candidate can be searched on a pixel line which lies in a position which is situated apart one sixth of the vehicle width car_width from the side edge of the preceding vehicle Vah. Thus, it is possible to configure such that a tail lamp area candidate can be searched on a plurality of pixel lines which are situated in various positions lying apart different distances from the side edge of the preceding vehicle. Furthermore, it is possible to configure such that the whole range within the frame line which indicates the preceding vehicle is searched for a tail lamp area candidate.

Thus, when the vertical tail lamp area candidate detecting operation on the reference image (step S1) is ended, following this, a horizontal tail lamp area candidate detecting operation (step S2) of the basic flowchart shown in FIG. 9 is performed.

Also, in the horizontal tail lamp area candidate detecting operation (step S2), detections are performed independently for left- and right-side tail lamp area candidates. In the following description, a detecting operation for the left-side tail lamp area candidate is mainly described. However, it is to be noted that a detecting operation for the right-side tail lamp area candidate is also performed at the same time that the left-hand side tail lamp area candidate detecting operation is performed.

[Horizontal Tail Lamp Area Candidate Detecting Operation]

The horizontal tail lamp area candidate detecting operation (step S2) is an operation for scanning pixel lines leftwards and rightwards on the reference image from the pixel line pls which was set as the pixel line which constitutes the reference for detection a tail lamp area candidate in the vertical detecting operation (step S1) and detecting a tail lamp area candidate on each pixel line while expanding the searching area leftwards and rightwards from the pixel line pls which constitutes the reference for tail lamp area candidate detection. This detecting operation is performed according to a procedure illustrated by a flowchart shown in FIG. 15.

In the horizontal tail lamp area candidate detecting operation, firstly, it is determined whether or not the tail lamp area candidate has been detected in the vertical detection and the pixel line pls which constitutes the reference for detection has been set (step S21).

Here, if no tail lamp area candidate has been detected and hence no pixel has been set which constitutes the reference for detection (step S21: NO), a loss counter in the memory is incremented by one (step S22). Then, if the value of the loss counter is equal to or more than a preset threshold value count_th (step S23: YES), the coordinates (cl_i, cl_j) of the left-side lamp detection point which are stored in the memory are reset (step S24)

The threshold value count_th of the loss counter is set to a value which corresponds, for example, to three seconds. Namely, in this case, if a state where the left-side tail lamp is not detected continues three seconds or more, since the coordinates (cl_i, cl_j) of the lamp detection point which was detected last come to have no meaning, the coordinates are deleted from the memory.

On the contrary, if the value of the loss counter has not yet reached the threshold value count_th (step S23: NO), the coordinates (cl_i, cl_j) of the last left-side lamp detection point are left stored in the memory as they are. This is because, for example, even though the left-side tail lamp becomes invisible momentarily, for example, due to the wiper moving on the windshield to interrupt the visibility thereof from the camera, it is visible again after the wiper has passed in front of the camera and the past coordinates can then be used effectively.

If the tail lamp area candidate was not detected in the vertical detection (step S21: NO), the operations described above are performed, and the horizontal tail lamp area candidate detecting operation on the reference image (step S2) of the basic flowchart shown in FIG. 9 is ended.

On the other hand, if the tail lamp area candidate was detected in the vertical detection (step S21: YES), following this, as has been described above, a tail lamp area candidate detecting operation is performed while scanning pixel lines leftwards and rightwards.

Firstly, the j coordinate jmax of the upper end and the j coordinate jmin of the lower end of the tail lamp area candidate which was detected in the vertical detection and stored in the memory are read out, respectively, and a center coordinate jmid therebetween and the number of pixels Rmax from the upper end to the lower end are calculated according to the following equations (7), (8), respectively, for initialization. In addition, a decrement flag is made to be flg←0 (step S25).

$$jmid \leftarrow (jmax+jmin)/2 \quad (7)$$

$$Rmax \leftarrow jmax-jmin+1 \quad (8)$$

Note that the arrows in the respective equations above mean the respective values stored in the memory are those which are to be updated or, specifically speaking, those which are to be overwritten. Arrows in the following equations is also used to that effect. In addition, the decrement flag flg is an index which indicates whether or not the number of pixels in a tail lamp area candidate tends to decrease and is described in detail later. In addition, the number of pixels from an upper end to a lower end of a tail lamp area candidate or the like is represented as the length of a tail lamp area candidate or the like.

Following this, it is set how farther towards left and right ends of a searching area is to be searched or to which i coordinate in left and right directions a search is to be performed (step S26).

In this embodiment, the i coordinates of the left and right ends of the searching area are basically calculated from the i coordinates cl_i, cr_i of the left and right lamp detection points (cl_i, cl_j), (cr_i, cr_j) which were detected in the past sampling cycles and are set based on the lamp-to-lamp distance lamp_width, which is described later, stored in the memory.

Specifically, the i coordinate of the pixel line pls on which the tail lamp area candidate was detected in the vertical detection (step S1) may be the same as or different from the i coordinate cl_i of the left-side lamp detection point (cl_i, cl_j) as has been described above, but when the i coordinate of the pixel line pls is expressed by id, a left-end i coordinate ilim(l) and a right-end i coordinate ilim(r) of the searching area are set as below, respectively;

$$ilim(l)=id-\text{lamp\_width}/4 \quad (9)$$

$$ilim(r)=id+\text{lamp\_width}/4 \quad (10)$$

In addition, if the lamp-to-lamp distance lamp_width is not stored, the vehicle width car_width is substituted for the lamp-to-lamp distance lamp_width in Equations (9), (10) above so as to calculate left- and right-end i coordinates ilim(l), ilim(r).

Figure 16:
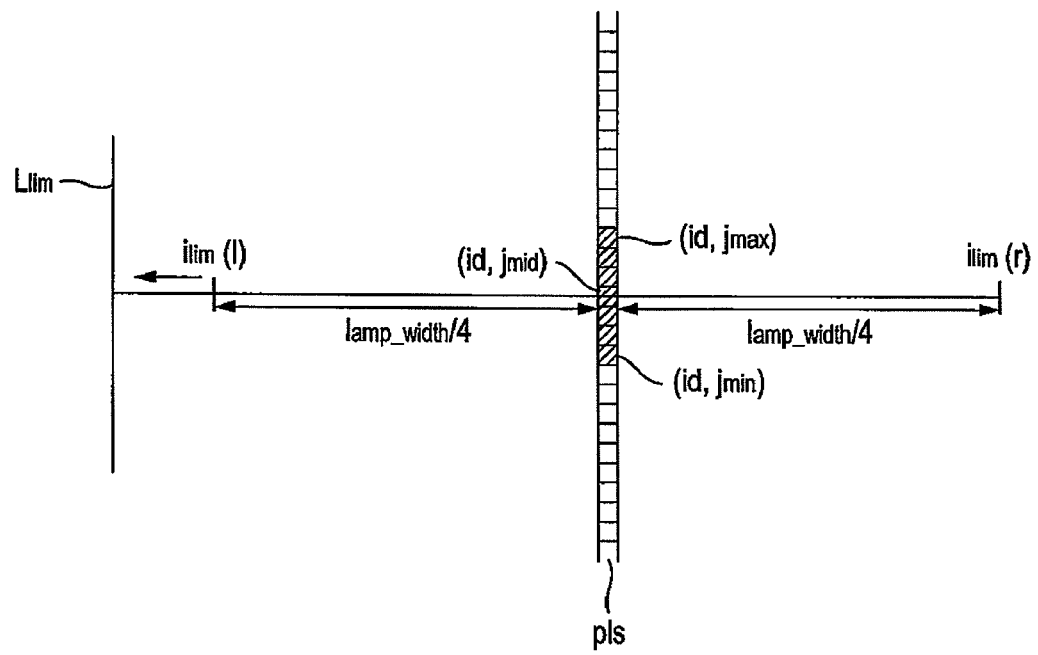
FIG. 16 is a diagram illustrating a process for setting a search area in the horizontal tail lamp area candidate detecting operation.

In addition, in the event that the left-end i coordinate ilim(l) of the searching area in the left-side tail lamp area coordinate detecting operation lies further inwards of the frame line which indicates the preceding vehicle as has been described before than the left-side end line of the frame line, and in the event that the right-end i coordinate ilim(r) of the searching area in the right-side tail lamp area coordinate detecting operation lies further inwards of the frame line than the right-side end line of the frame line which indicates the preceding vehicle, in order to secure a wide searching area, as is shown in FIG. 16, the left and right ends of the searching area are extended as far as the left-side end line Llim and the right-side end line Rlim of the frame line, respectively.

In the horizontal tail lamp area coordinate detecting operation, following the above, pixels are scanned sequentially leftwards (step S27) and rightwards (step S28) from the pixel line pls which was set as the pixel line which constitutes the reference for detection of a tail lamp area candidate in the vertical detecting operation so as to detect a tail lamp area candidate on each pixel line. The direction is set as required in which the detection is started first.

Figure 17:
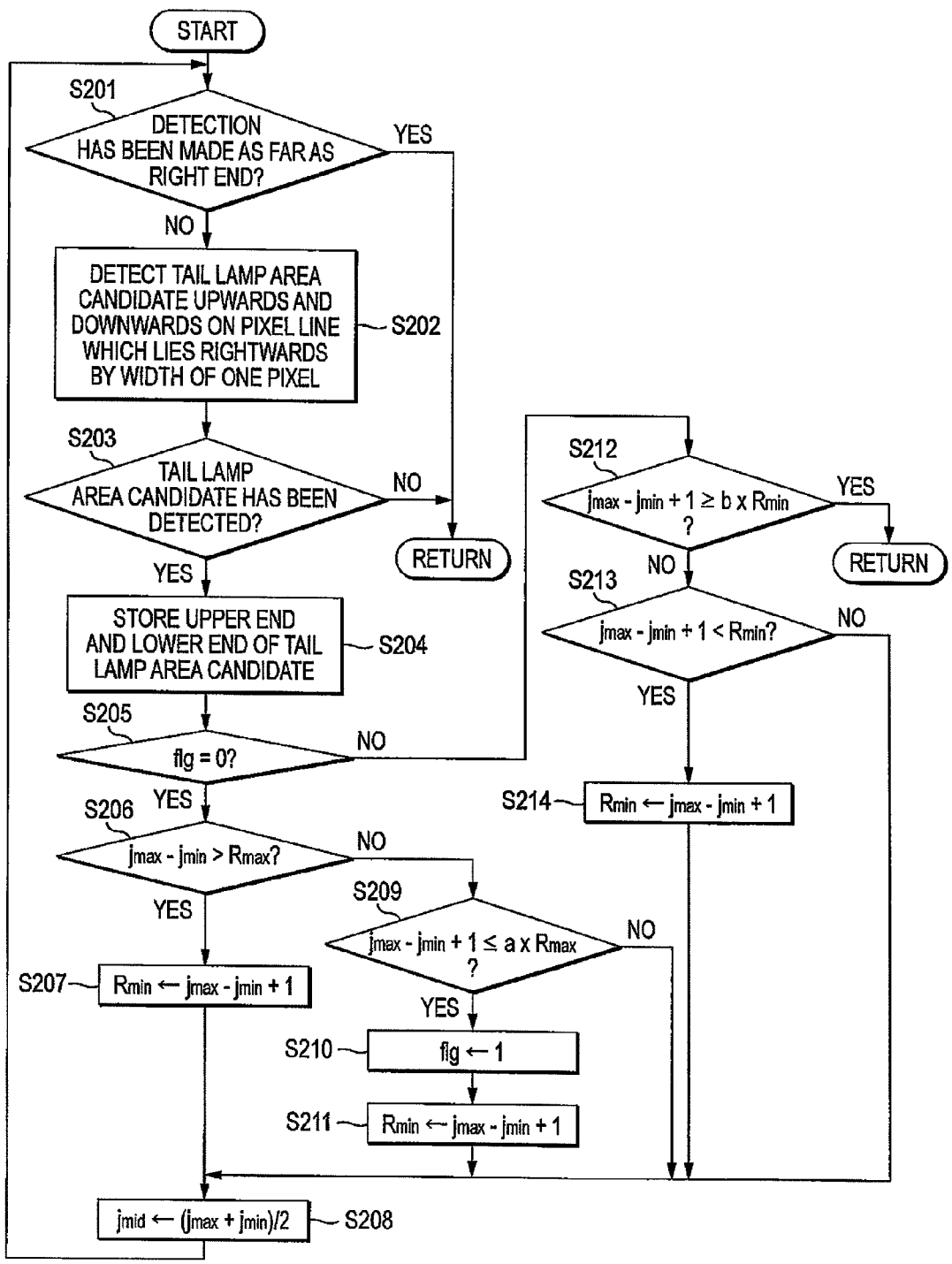
FIG. 17 is a flowchart showing a procedure of a transverse detecting operation.

The horizontal tail lamp area candidate detecting operations which are performed on pixel lines in the leftward and rightward directions are performed according to a subroutine of a transverse detecting operation SUB4 illustrated by a flowchart shown in FIG. 17. The subroutine of the transverse detecting operation SUB4 below is used at least four times in total in detection of tail lamp area candidates on pixel lines which are scanned in the leftward and rightward directions, respectively, for the left- and right-side tail lamps while making necessary modifications such as a modification of the "right end" to the "left end."

Due to this, here, a rightward tail lamp area candidate detecting operation on a pixel line pls which constitutes a reference for detection of the right-side tail lamp is described which exhibits the most obvious characteristics of the transverse detecting operation SUB4 below. Note that the following description is made based on the understanding that the tail lamp area candidate detection operation for the left-side tail lamp has already been completed.

[Transverse Detecting Operation SUB4]

Figure 18:
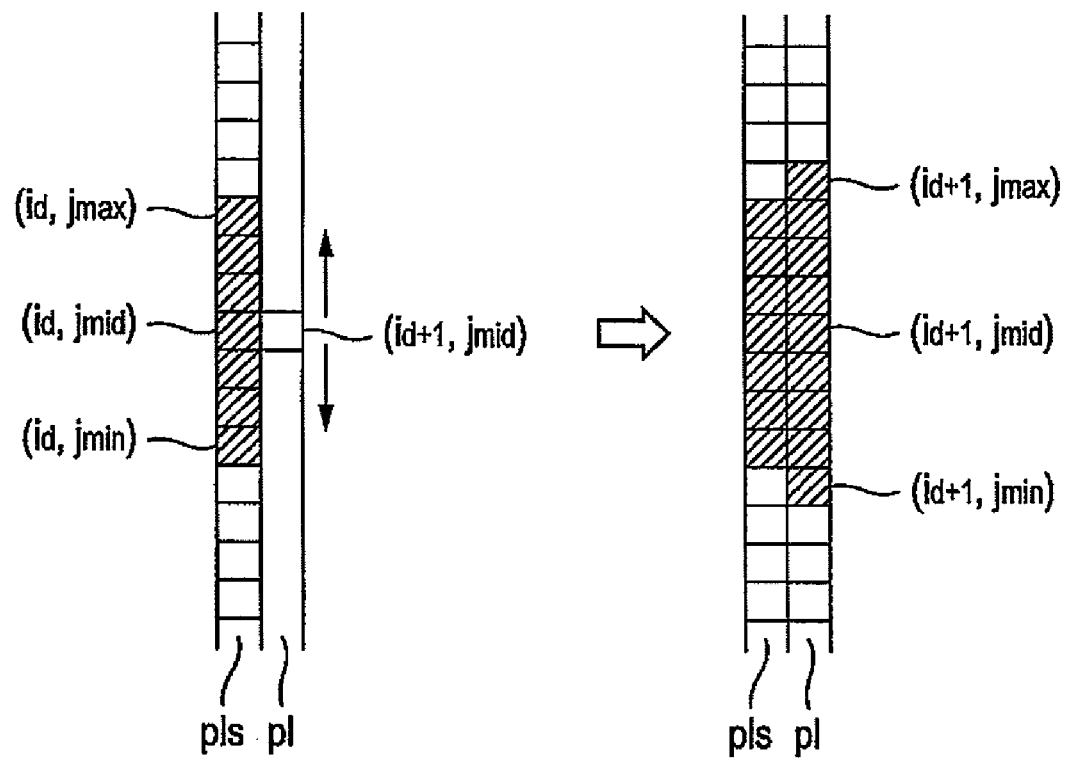
FIG. 18 is a diagram illustrating a process for detecting a tail lamp area candidate on a pixel line which lies adjacent to a right side of a pixel line which constitutes a reference for the transverse detecting operation.

In the transverse detecting operation SUB4, firstly, if the detection has not performed yet to the right-end i coordinate ilim(r) of the searching area (step S21: NO), as is shown in FIG. 18, scanning is shifted to a pixel line pl which lies adjacent to a right side of the pixel line pls (letting its i coordinate be id) which constitutes the reference for detection of a tail lamp area candidate, and upward and downward tail lamp area candidate detections are performed on the pixel line pl which lies adjacent to the right side of the reference pixel line pls according to the upward tail lamp area candidate detecting operation SUB1 and the downward tail lamp area candidate detection operation SUB2 from as a starting point a pixel (id+1, jmid) whose j coordinate is the same as the center coordinate jmid of the reference pixel line pls (step S202).

Namely, pixels on the vertical pixel line pl are scanned pixel by pixel upwards and downwards starting from the pixel (id+1, jmid) to detect the luminance plij of each pexel, so as to detect coordinates (id+1, jmax), (id+1, jmin) of a pixel which lies immediately before a pixel whose luminance plij becomes less than the second threshold value br_th2. However, no further search is performed which exceeds the lower end js and the upper end je of the searching area shown in FIG. 13.

As this occurs, the luminance plij of the pixel (id+1, jmid) of the current pixel line pl is already less than the second threshold value br_th2, it being judged that no tail lamp area candidate has been detected (step S203: NO), the transverse detecting operation SUB4 in the direction, that is, in the rightward direction from the reference pixel line pls is ended.

On the other hand, if the luminance plij of the pixel (id+1, jmid) of the current pixel line is equal to or more than the second threshold value br_th2 and a tail lamp area candidate is detected (step S203: YES), an upper end coordinate (id+1, jmax) and a lower end coordinate (id+1, jmin) of the tail lamp area candidate so detected are stored in the memory (step S204).

In addition, although the description thereof is omitted due to the flowchart being made complex, in this embodiment, in order to detect a highest point and a lowest point of the tail lamp area candidate on the reference image, if the upper end j coordinate jmax of the detected tail lamp area candidate is larger than the past maximum value, the value of the upper end j coordinate jmax is made to be stored as the past maximum value in the memory, and if the lower end j coordinate jmin is smaller than the past minimum value, the value of the lower end j coordinate jmin is made to be stored as the past minimum value in the memory.

Following this, it is judged whether or not the decrement flag flg is 0 (step S205). Since the decrement flag flg is 0 now (step S205: YES), following this, it is judged whether or not a vertical length jmax−jimn+1 of the tail lamp area candidate is larger than the maximum value Rmax of the length of the tail lamp area candidate (step S206).

As has been described above, since the length of the tail lamp area candidate detected on the reference pixel line pls is initialized for the maximum value Rx of the length, if the length of the tail lamp area candidate detected on the current pixel line pl is longer than the initialized length (step S206: YES), the maximum value Rmax of the length is updated to the length of the tail lamp area candidate detected on the current pixel line pl (step S207) to be stored in the memory.

In this way, while the decrement flag flg is staying at 0, the length of a longest tail lamp area candidate in tail lamp area candidates which are detected as a result of pixel lines pl being scanned sequentially in the rightward direction updates the maximum value Rx.

Then, every time a tail lamp area candidate is detected on each pixel line pl, a center coordinate jmid between an upper end and a lower end thereof is calculated based on Equation (7) above (step S208), and the operation flow returns to the step S201, where the center coordinate jmid so calculated then constitutes a starting point for a tail lamp area candidate detection operation (step S202) on the next pixel line pl in the rightward direction to the pixel line pl on which the tail lamp area candidate detecting operation was ended just now.

In addition, although the length jmax−jmin+1 of the tail lamp area candidate detected on the current pixel pl is not longer than the maximum value Rx, if the length is longer than a preset constant number a of times the maximum value Rx (step S209: NO), the operation flow proceeds to the operation at the step S208. Here, the constant a is set to fall within a range of 0<a<1, and is set, for example, to 0.8.

Namely, for example, if the length Rpre of a tail lamp area candidate detected on the current pixel line pl is equal to the maximum value Rmax as is shown in FIG. 19A, or although the length Rpre of the tail lamp area candidate on the current pixel line pl is shorter than the maximum value Rx, if it is longer than 0.8 time the maximum value Rx as is shown in FIG. 19B (step; S209: NO) the operation flow immediately proceeds to the operation at the step S208.

As is shown in FIG. 19C, however, when the length Rpre of the current tail lamp area candidate becomes equal to or less than the constant a of times the maximum value Rx (for example, 0.8) (step S209: YES), the decrement flag flg←1 (step S210). In this way, the decrement flag flg becomes an index which indicates that the length of the tail lamp area candidate tends to decrease as pixel lines pl are scanned in the transverse direction.

When the decrement flag flg is made to be one and it is judged that the length of the tail lamp area candidate tends to decrease, a maximum value Rmin of the length of the tail lamp area candidate is set to be updated, and the minimum value Rmin of the length of the tail lamp area candidate is started to be monitored. Firstly, the length jmax−jmin+1 of the tail lamp area candidate detected on the current pixel line pl is set as the minimum value Rmin of the length (step S211).

In addition, when the decrement flag flg is made to be one, since it is determined in the determination in the step S205 that the decrement flag flg is not zero (step S205: NO), a detecting operation is performed according to a different routine from the routine that has been described above from the next pixel line pl onward (steps S212 to S214). In addition, in the normal state (step S212: NO), if the length jmax−jmin+1 of the tail lamp area candidate detected is smaller than the minimum value Rmin (step S213: YES), the minimum value Rmin is updated (step S214), and the detection continues from a pixel line pl which lies adjacent to the right of the pixel line pl on which the detection was finished just now.

Here, as is seen from the flowchart shown in FIG. 17, the decrement flag flg may never return to zero until the transverse detecting operation SUB4 in the current direction is ended, and the determination is maintained that the length of the tail lamp area candidate tends to decrease for scanning from the next pixel line pl onward.

Figure 20:
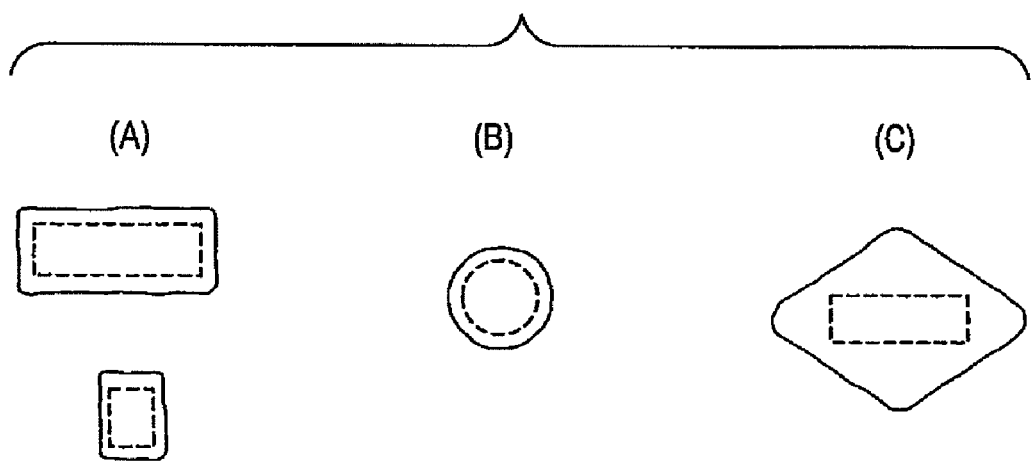

This is done based on the knowledge that when the light of the tail lamp is captured, as is shown in FIGS. 20A, 20B, a highly bright area is captured on the reference image in such a way as to expand into a substantially square or circular shape around the tail lamp which is indicated by a broken line, and when the light of the tail lamp is captured while it is raining, as is shown in FIG. 20C, a highly bright area is captured in such a way that it expands largely near the center of the tail lamp.

Namely, in the normal state, the highly bright area which results from the light of the tail lamp being captured is captured in such a way that the vertical length of the highly bright area gets shorter as it moves from the vicinity of the center of the tail lamp towards left and right ends thereof, respectively, and at least once the vertical length starts to decrease, it is in no case start to get longer again. To describe this differently, in the event that the vertical length of the tail lamp area candidate which is detected while scanning pixel lines pl line by line from the reference pixel line pls towards left and right ends of the captured image starts to increase again after it once started to decrease, it is considered that anything abnormal has happened.

Due to this, with the determination maintained that the length of the tail lamp area candidate tends to decrease, the length of the tail lamp area candidate is monitored while updating the minimum value Rmin thereof. In addition, in the event that a tail lamp area candidate is detected which is longer than the minimum value Rmin, it is possible to grasp the fact that something abnormal occurred at that point in time, and the transverse detecting operation SUB4 in the direction in question can forcibly be ended.

Figure 21:
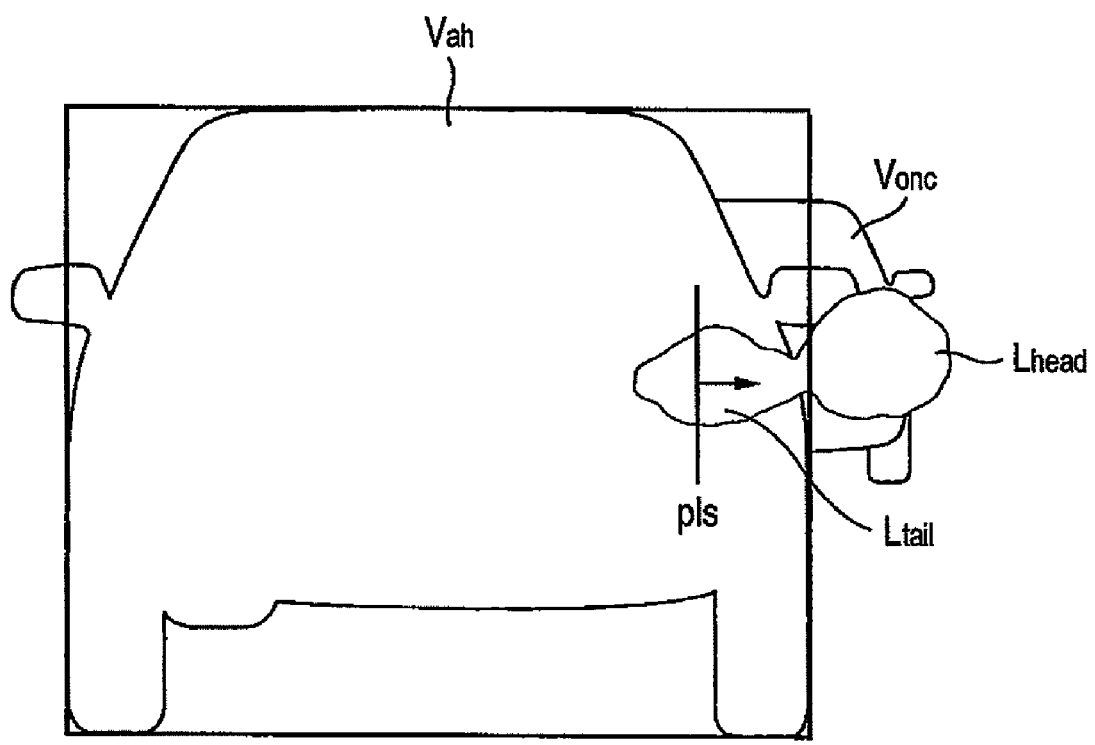
FIG. 21 is a diagram illustrating a situation where a pixel area of light from the tail lamp of the preceding vehicle and a pixel area of light of a headlamp of an oncoming vehicle are captured as an integrated highly bright area.

As an example of the abnormal case, there is raised, for example, a situation as shown in FIG. 21 where a pixel area where light Ltail of the tail lamp of the preceding vehicle Vah is captured and a pixel area where light Lhead of the headlamp of the oncoming vehicle Vonc are captured as an integral area having high luminance or integral highly bright area on the reference image and as a result, the light of the tail lamp and the light of the headlamp cannot be discriminated from each other. This phenomenon tends to occur easily in the tail lamp area candidate detecting operation for the right-side tail lamp when pixels pl are scanned rightwards from the reference pixel pls.

Figure 19:
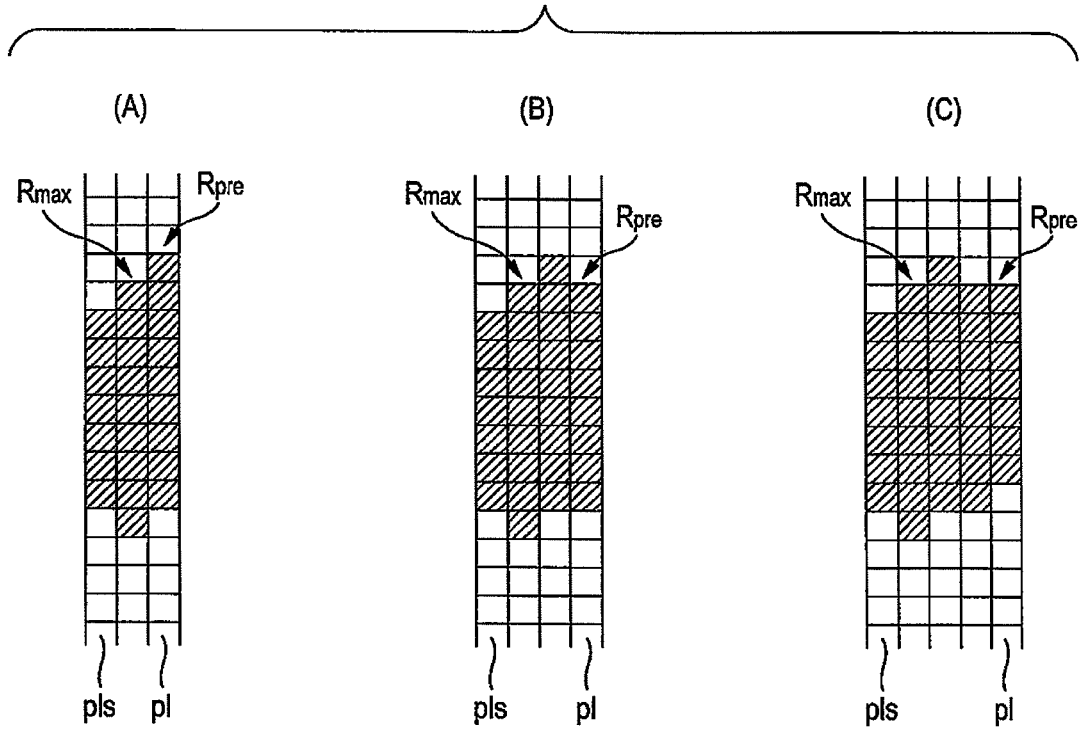
Figure 22:
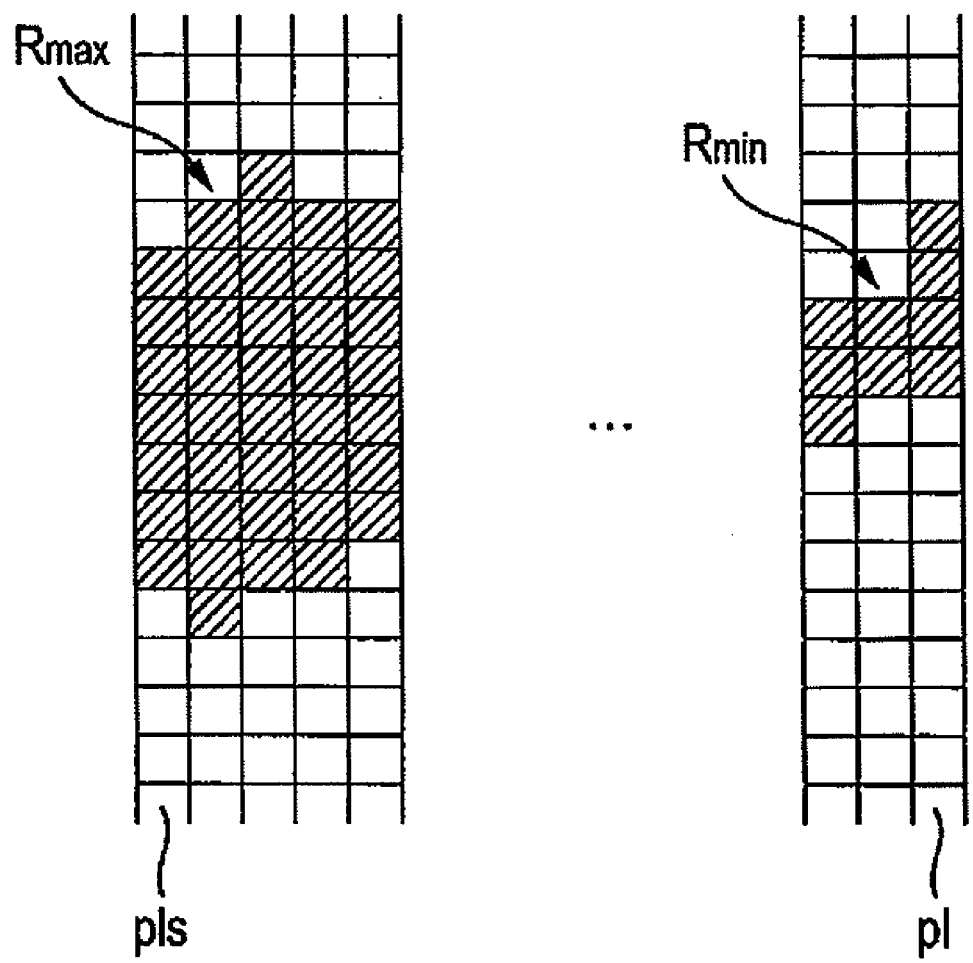
FIG. 22 is a diagram showing a situation where the length of the tail lamp area candidate starts to increase after it once showed a decreasing tendency.

As this occurs, for example, when the rightward tail lamp area candidate detecting operation continues as is shown in FIG. 19, the length Pre of the tail lamp area candidate starts to increase again, as is shown in FIG. 22, after it once showed the decreasing tendency, and in the event that the detecting operation is allowed to continue in that way, the light Lhead of the headlamp of the oncoming vehicle Vonc is likely to be detected erroneously as the light Ltail of the tail lamp of the preceding vehicle Vah.

Due to this, in the transverse detecting operation SUB4, the transverse detecting operation is made to be forcibly ended at a stage where the length jmax−jmin+1 (that is, Rpre) of the tail lamp area candidate reaches or exceeds a constant b number times of the minimum value Rmin of the length which has been updated until then (step S212: YES), so that the tail lamp area candidate detecting operation is not performed any further.

Here, the constant b is set to fall within a range of b>1. However, in the event that the constant b is set to a value which is very close to one, the detecting operation is ended due to an error of the length Rpre of the tail lamp area candidate, whereas in the event that the constant b is set to a very large value, the detecting operation is not ended although there occurs an erroneous detection. Due to this, the constant b is preferably set to a range of the order of 1<b<1.5, and it is set, for example, to 1.2.

Thus, while the basic flow of the transverse detecting operation SUB4 has been described heretofore, in particular, in the tail lamp area candidate detecting operation towards the lane for oncoming vehicles as viewed from the subject vehicle, that is, in the rightward tail lamp area candidate detection operation, the problem of erroneous detection described above tends to occur, and therefore, to cope with this problem, a mechanism for identifying, in particular, the light Lhead of the headlamp of the oncoming vehicle vonc is provided in the tail lamp detection module 14 in order to prevent more strictly the erroneous detection. When this mechanism identifies the light Lhead of the headlamp of the oncoming vehicle Vonc, the following right-side tail lamp detecting limited operation SUB5 is designed to be activated.

Figure 23:
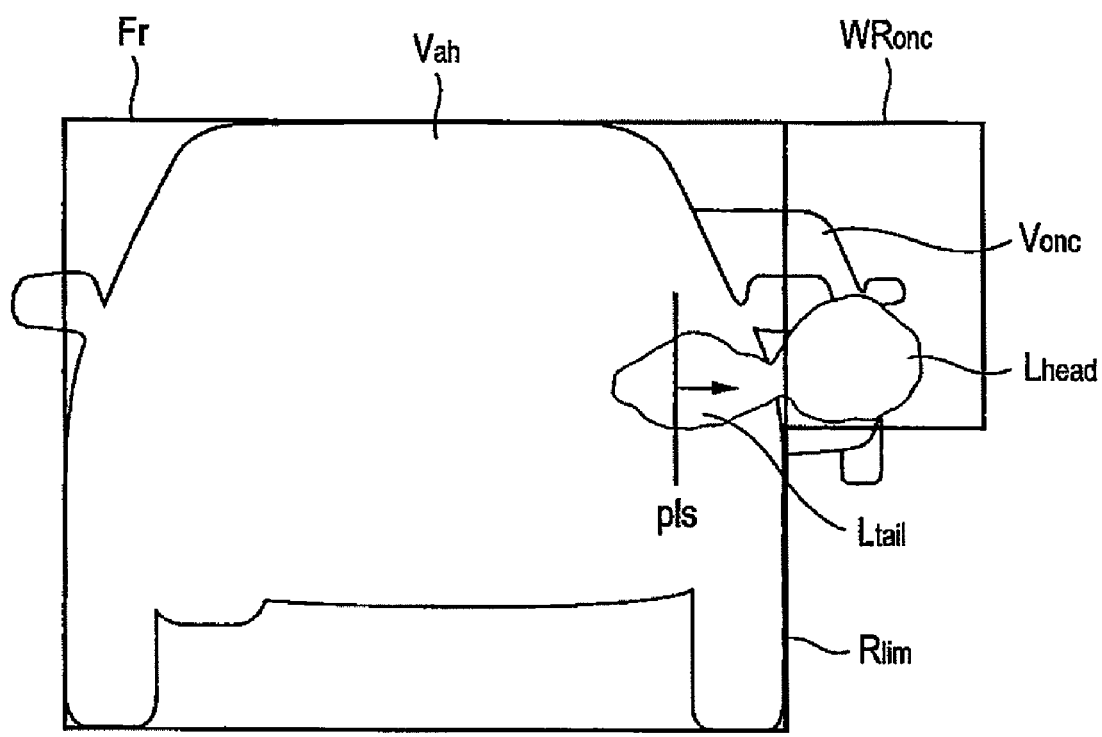
FIG. 23 is a diagram illustrating a monitoring area set on the image.

As the mechanism for identifying the light Lhead of the headlamp of the oncoming vehicle Vonc, a configuration is adopted in which when a frame line Fr indicating the preceding vehicle Vah is set, as is shown in FIG. 23, a monitoring range WRonc having a predetermined pixel area is set to a side of a point at infinity on the reference image in a region lying further outwardly rightwards than a right-side end line Rlim of the frame line Fr in such a manner as to be brought into contact with the right-side end line Rlim. In addition, the interior of the monitoring range WRonc is monitored, and in the event that a predetermined number or more of pixels having a luminance plij which is equal to or more than a predetermined threshold value br_th3 are detected in the interior of the monitor range WRonc, the light Lhead of the headlamp of the oncoming vehicle Vonc is made to be identified.

[Right-side Tail Lamp Detecting Limited Operation SUB5]

In addition, when the light Lhead of the headlamp of the oncoming vehicle Vonc is identified, firstly, the past lamp-to-lamp distance is read out from the memory. Then, as is shown in FIG. 24, the right-side tail lamp detecting limited operation SUB5 is started to operate at a point in time at which the pixel line pl on which the tail lamp area candidate is detected in the right-side tail lamp reaches a pixel line which lies apart the lamp-to-lamp distance lamp_width from a right-side end pixel of the whole area of the tail lamp area candidate of the left-side tail lamp on which the detecting operation has already been performed.

In the right-side tail lamp detecting limited operation SUB5, it is normally determined whether or not an upper end j coordinate jmax of any tail lamp area candidate that is detected during the scanning of the starting pixel line and pixel lines thereafter for detection of a tail lamp area candidate takes a larger value of the j coordinate of the highest point of the tail lamp area of the left-side tail lamp and whether or not a lower end j coordinate jmin of the tail lamp area candidate takes a smaller value of the j coordinate of the lowest point of the tail lamp area of the left-side tail lamp, and the transverse detecting operation SUB4 is forcibly ended at a point in time at which either of those conditions is satisfied, so that the tail lamp area candidate detecting operation is not performed any further.

Figure 24:
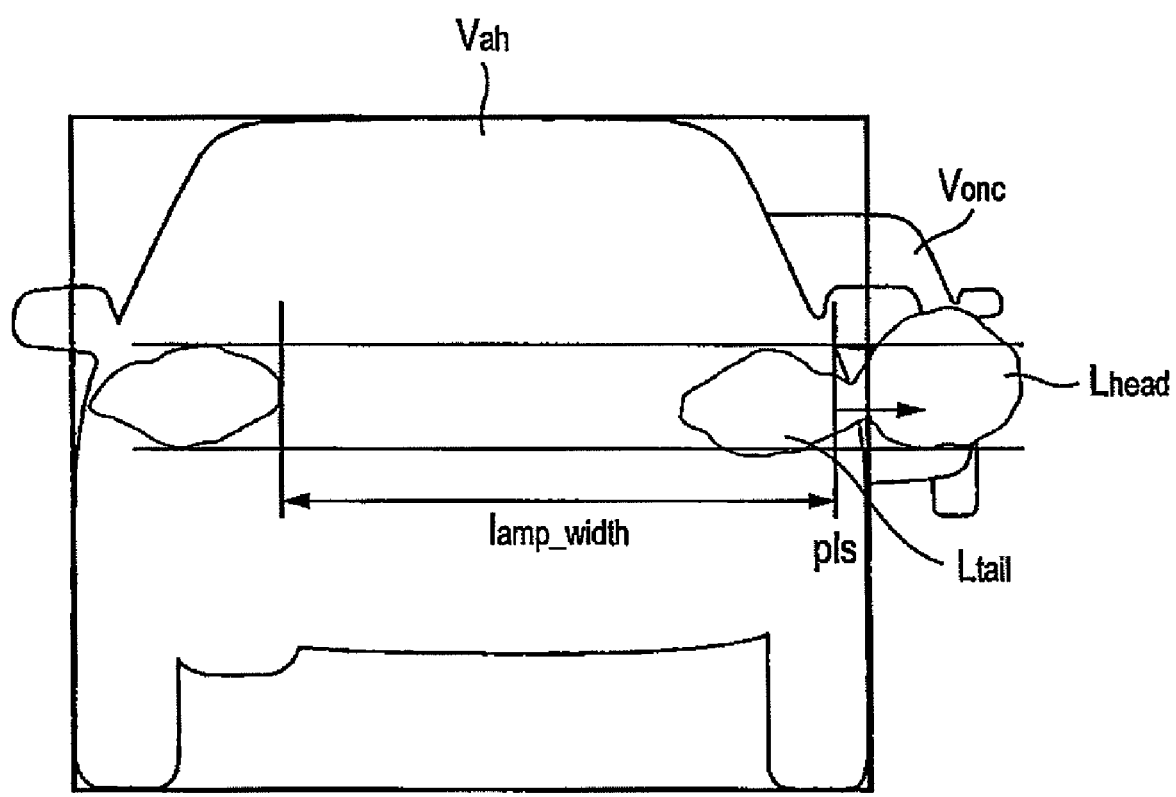
FIG. 24 is a diagram illustrating a process of a right-side tail lamp detecting limited operation.

In the example shown in FIG. 24, while the transverse detecting operation SUB4 is forcibly ended due to the determination in the step S212 of the transverse detecting operation SUB4 rather than due to the right-side tail lamp detecting limited operation, the right-side tail lamp detecting limited operation SUB5 can forcibly ends the transverse detecting operation SUB4 in an effective fashion when the fact that the length of the tail lamp area candidate starts to decrease cannot be identified due to the influence of the light Lhead of the headlamp of the oncoming vehicle Vonc or when the position of the tail lamp area candidate is raised or lowered on the reference image in association with the light Lhead of the headlamp of the oncoming vehicle Vonc although the length of the tail lamp area candidate decreases that much.

Figure 15:
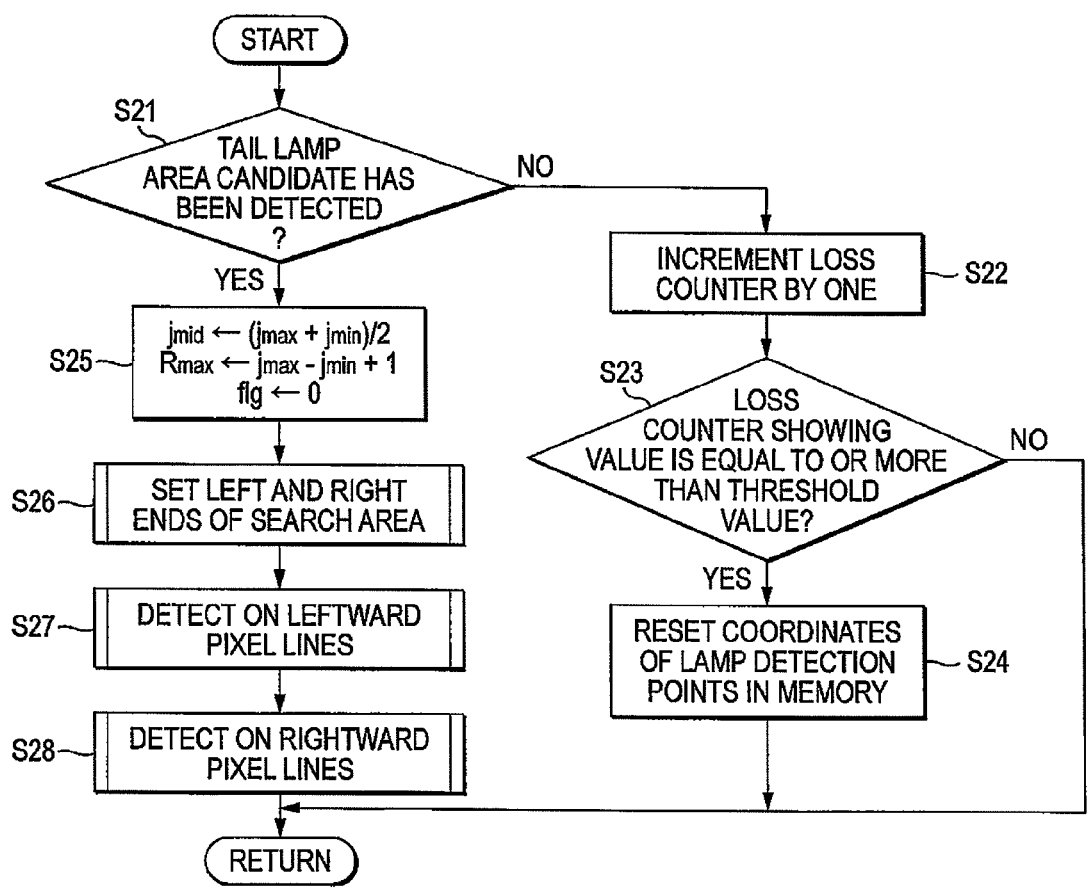
FIG. 15 is a flowchart showing a procedure of a horizontal tail lamp area candidate detecting operation.

Thus, when the detecting operation for a tail lamp area candidate is performed leftwards (step S27 in FIG. 15) and rightwards (step S28) from the pixel line pls which constitutes the reference for detection of a tail lamp area candidate under the transverse detecting operation SUB4 and the detecting operation is completed on both the left- and right-side tail lamps, the operation based on the flowchart in FIG. 15 is completed, and the horizontal tail lamp area candidate detecting operation on the reference image (step S2) illustrated by the basic flowchart in FIG. 9 is ended.

In addition, at a point in time at which this detecting operation is ended, the upper end coordinates (id±n, jmax) and lower end coordinates (id±n, jmin) of the tail lamp area candidates detected on the respective pixel lines pls, pl for the left- and right-side tail lamps are stored in the memory. Namely, the whole areas of the tail lamp area candidates for the left- and right-side tail lamps are detected, and the upper end and lower end coordinates of all the pixel lines pls, pl which belong to the tail lamp areas are stored in the memory.

When the horizontal tail lamp area candidate detecting operation on the reference image (step S2) is ended in the way described heretofore, following this, the tail lamp area detecting and data calculating operation (step S3) illustrated in the basic flowchart in FIG. 9 is performed.

[Tail Lamp Area Detecting and Data Calculating Operation]

Of the tail lamp area detecting and data calculating operation (step S3), the tail lamp area detecting operation is an operation for evaluating the matching of the two tail lamp area candidates which are detected on the left and right sides of the preceding vehicle is evaluated and evaluating the matched tail lamp area candidates are evaluated as areas where the tail lamps of the preceding vehicle are captured, so as to detect the areas as the tail lamp areas. In addition, the data calculating operation is an operation for calculating central points of the areas where the left- and right-side tail lamps of the preceding vehicle are captured, that is, lamp detection points (cl_i, cl_j), (cr_i, cr_j), as well as a distance between the central points of the left and right tail lamp areas, that is, a lamp-to-lamp distance lamp_width. This detecting operation is to be performed according to a procedure illustrated by a flowchart shown in FIG. 25.

In this operation, firstly, before starting the tail lamp area detecting and data calculating operation, an adjusting operation of the first threshold value br_th1 and the second threshold value br_th2 which are used in detecting a tail lamp area candidate on the pixel lines pls, pl is performed (step S31). In this adjusting operation, the total number of pixels which are included in each of the left and right tail lamp area candidates are counted from the upper end and lower end coordinates of the whole area of each of the left and right tail lamp area candidates which are stored in the memory, and the values of the first threshold value br_th1 and the second threshold value br_th2 are varied based on the total numbers of the pixels so counted.

Specifically, in the event that at least one of the left and right total numbers of pixels is less than a preset threshold value Ar_th1, the values of the first threshold value br_th1 and the second threshold value br_th2 which are expressed by the luminance scale made up of 256 luminance levels are decreased by five, respectively. Namely, in the event that the total number of pixels of the tail lamp area candidate where the tail lamp is captured is less than the threshold value Ar_th1, in order to ease the detection of the light of the tail lamp, the values of the first threshold value br_th1 and the second threshold value br_th2 are decreased slightly each for every single sampling cycle. However, lower limits are provided for the first threshold value br_th1 and the second threshold value br_th2, respectively.

On the other hand, in the event that at least one of the left and right total numbers of pixels is more than a preset threshold value Ar_th2 (where, Ar_th2>Ar_th1), the values of the first threshold value br_th1 and the second threshold value br_th2 are increased by five each. Namely, in the event that the total number of pixels of the tail lamp area candidate is more than the threshold value Ar_th2, in order to make it difficult to detect the light of the tail lamp because too much light of the tail lamp is detected, the values of the first threshold value br_th1 and the second threshold value br_th2 are increased slightly each for every single sampling cycle. However, upper limits are provided for the first threshold value br_th1 and the second threshold value br_th2, respectively.

The first threshold value br_th1 and the second threshold value br_th2 are adjusted in the ways described above.

Following the above, the tail lamp area detecting and data calculating operation is performed. Firstly, as the data calculating operation, central points in the left and right tail lamp area candidates, that is, lamp detection points (cl_i, cl_j), (cr_i, cr_j) are calculated to be stored in the memory (step S32).

Figure 26:
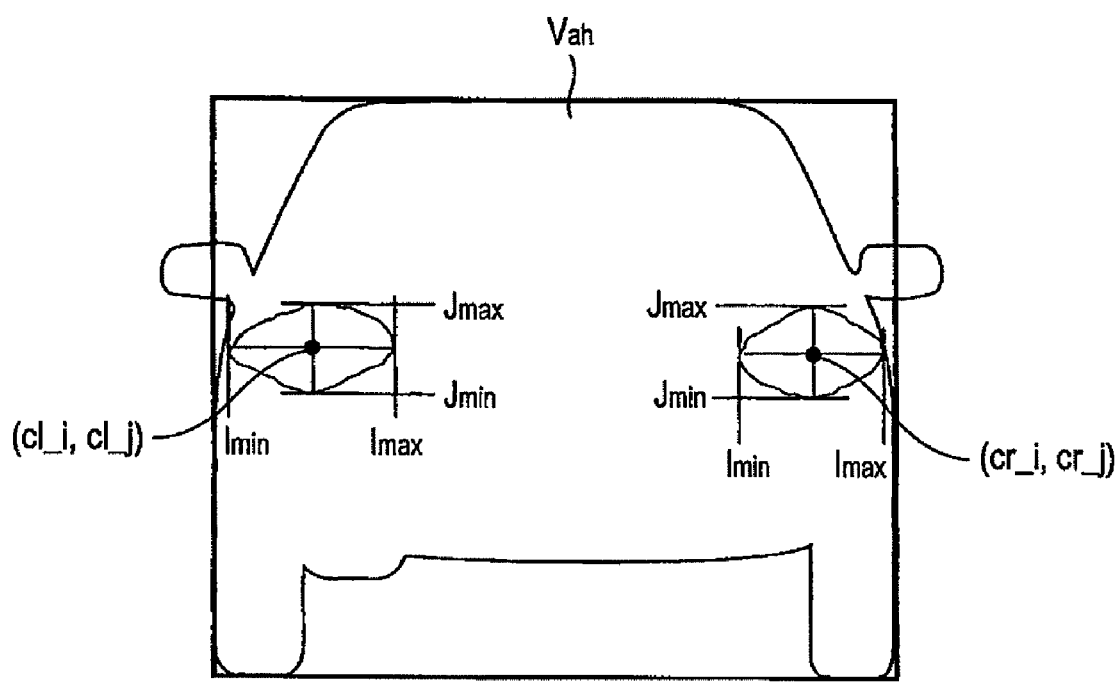
FIG. 26 is a diagram illustrating a highest point, a lowest point, a left-side end pixel line, a right-side end pixel line and a lamp detection point of each tail lamp area candidate.

Since the highest points and lowest points of the tail lamp area candidates on the reference image were detected and are stored, as is shown in FIG. 26, j coordinates cl_j, cr_j of the left and right lamp detection points are each calculated as a central point between the highest point Jmax and the lowest point Jmin. In addition, i coordinates cl_i, cr_i of the left and right lamp detection points are each detected as a central point between an i coordinate Imin of the left-side end pixel pl and an i coordinate Imax of the right-side end pixel pl which defined the detected tail lamp area candidate when the pixels were scanned leftwards and rightwards from the reference pixel line pls, respectively.

Note that how to calculate the left and right lamp detection points (cl_i, cl_j), (cr_i, cr_j) are not limited to the calculation process of this embodiment, and hence, they can each be detected as a central point between an upper end and a lower end of a tail lamp area candidate on a pixel line where a tail lamp area candidate is detected whose length constitutes a maximum value Rmax.

Figure 27:
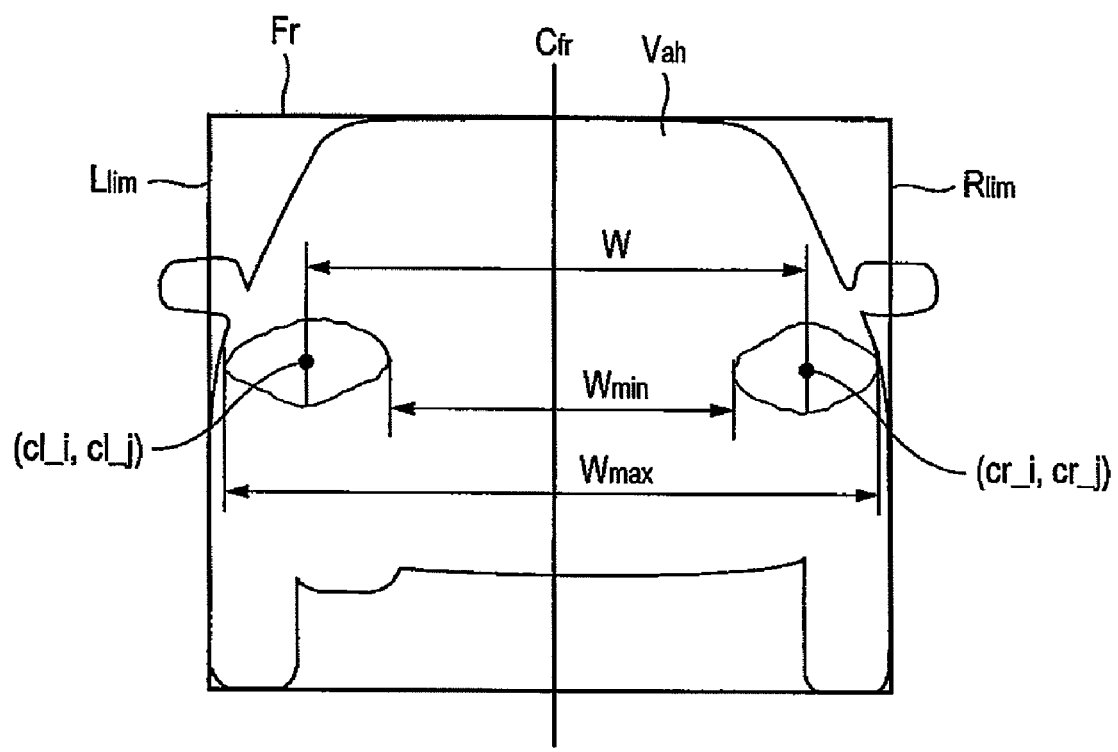
FIG. 27 is a diagram illustrating a shortest distance, a longest distance and a distance between lamp detection points of left and right tail lamp area candidates.

Following this, a tail lamp area detecting operation is performed. In the tail lamp area detecting operation, firstly, it is determined whether or not a distance Wmin between a right-side end of a left-side tail lamp area candidate and a left-side end of a right-side tail lamp area candidate, which are shown in FIG. 27, is equal to or less than a threshold value TH1 (step S33).

As this occurs, since the disparities at the edge portions of the left and right tail lamp area candidates are given as the range image, the distance Wmin, which is a shortest distance between the left and right tail lamp area candidates, is calculated as a distance in the actual space based on Equations (1) and (3) above. Namely, Z is calculated from Equation (3) for each of the right-side end of the left-side tail lamp area candidate and the left-side end of the right-side tail lamp area candidate, and Z and i in Equation (1) are substituted by the Z's so calculated and the respective i coordinates so as to calculate X coordinates in the vehicle-width direction, respectively, whereby a distance in the actual space is calculated by obtaining a difference therebetween.

In addition, in place of calculating the distance Wmin based on the disparities at the edge portions, the distance Wmin may be calculated by substituting Z in Equation (1) by a distance between the subject vehicle and the preceding vehicle Vah which was measured by a radar system, for example. In addition, the threshold value TH1 is set, for example, to 3 m.

If the shortest distance Wmin between the left and right tail lamp area candidates is larger than or equal to the threshold value TH1 (step S33: NO), the left and right lamp detection points (cl_i, cl_j), (cr_i, cr_j) and the left-side end line Llim and the right-side end line Rlim of the frame line Fr are compared, respectively, and information on the coordinates of the lamp detection point which deviates outwards from the left-side end line Llim or the right-side end line Rlim is deleted from the memory (step S34), the tail lamp area detecting and data calculating operation being ended. If both the lamp detection points so deviate, the lamp detection point which lies apart farther from the left-side end line Llim or the right-side end line Rlim is deleted.

In addition, if the shortest distance Wmin between the left and right tail lamp area candidates is equal to or smaller than the threshold value TH1 (step S33: YES), following this, it is determined whether or not a distance Wmax between a left-side end of the left-side tail lamp area candidate and a right-side end of the right-side tail lamp area candidate is equal to or larger than or equal to a threshold value TH2 (step S35). The distance Wmax, which is a longest distance between the left and right tail lamp area candidates, is also calculated similarly as a distance in the actual space. In addition, the threshold value TH2 is set, for example, to 1 m.

If the longest distance Wmax between the left and right tail lamp area candidates is smaller than the threshold value TH2 (step S35: NO), since there exists a situation where the tail lamp area candidate which has been detected as the left or right tail lamp is actually a license plate lamp, in this case, information on the coordinates of the lamp detection point of either the left-side tail lamp area candidate or the right-side tail lamp area candidate whose right-side end or left-side end lies on an opposite side a center line Cfr of the frame line Fr after it has passed thereacross is deleted from the memory (step S36), and the tail lamp area detecting and data calculating operation is ended. If both the right-side end of the left-side tail lamp area candidate and the left-side end of the right-side tail lamp area candidate lie on the opposite sides of the center line Cfr, the coordinates of both the lamp detection points are deleted from the memory.

If the longest distance Wmax between the left and right tail lamp area candidates is equal to or larger than or equal to the threshold value TH2 (step S35: YES), following this, a distance W in the actual space between the lamp detection points (cl_i, cl_j), (cr_i, cr_j) of the left and right tail lamp area candidates which are detected in this time's sampling cycle is compared with the past lamp-to-lamp distance lamp_width.

Firstly, it is determined whether or not the extension of the lamp-to-lamp distance obtained in this time's sampling cycle relative to the past lamp-to-lamp distance lamp_width falls within a predetermined range (step S37). In this embodiment, the extension is determined to fall within the predetermined range only when the following conditions (4), (5) are satisfied.

$$\text{Condition4: } W < \text{lamp\_width} \times 1.5 \tag{11}$$

$$\text{Condition5: } W - \text{lamp\_width} < 250\text{mm} \tag{12}$$

Note that a constant in Equation (11) and the value of the right-side member of Equation (12) are determined as required.

Then, if it is determined that at least either Condition 4 or Condition 5 is not satisfied (step S37: NO), the operation flow proceeds to step S34, where of the left and right lamp detection points (cl_i, cl_j), (cr_i, cr_j), the information on the coordinates of the lamp detection point which deviates outwards from the left-side end line Llim or the right-side end line Rlim of the frame line Fr is deleted from the memory, and the tail lamp area detecting and data calculating operation is ended. If both the light detection points so deviate, the lamp detection point which lies apart farther from the left-side end line Llim or the right-side end line Rlim is deleted.

In addition, if it is determined that both Condition 4 and Condition 5 are satisfied (step S37: YES), this time, it is determined whether or not the contraction of the distance W between the lamp-to-lamp distance obtained in the current sampling cycle relative to the past lamp-to-lamp distance lamp_width falls within a predetermined range (step S38). In this embodiment, the contraction is determined to fall within the predetermined range only when the following conditions (6), (7) are both satisfied.

$$\text{Condition6: } W > \text{lamp\_width} \times 2/3 \quad (13)$$

$$\text{Condition7: lamp\_width} - W > 500 \text{mm} \quad (14)$$

Note that a constant in Equation (13) and the value of the right-side member of Equation (14) are determined as required.

Then, if it is determined that at least either Condition 6 or Condition 7 is not satisfied (step S38: NO), the operation flow proceeds to step S36, where information on the coordinates of the lamp detection point of either the left-side tail lamp area candidate or the right-side tail lamp area candidate whose right-side end or left-side end lies on the opposite side of the center line Cfr of the frame line Fr after it has passed thereacross is deleted from the memory, or if the right-side end of the left-side tail lamp area candidate and the left-side end of the right-side tail lamp area candidate both lie on the opposite sides of the center line Cfr after they have passed thereacross, information on the coordinates of both the lamp detection points is deleted from the memory, and the tail lamp area detecting and data calculating operation is ended.

On the other hand, if it is determined that any of the determinations (in steps S33, S35, S37, S38) is positive, the left and right tail lamp area candidates are evaluated as the areas where the tail lamps of the preceding vehicle Vah are captured in the reference image, that is, as the tail lamp areas, whereby the detection of tail lamp areas is ended (step S39).

When the step S39 is completed, this time, as the data calculating operations, a distance between the subject vehicle and the preceding vehicle Vah is calculated based on a transverse distance cr_i−cl_i between the left and right lamp detection points (cl_i, cl_j), (cr_i, cr_j) on the reference image which are obtained in this time's sampling cycle and the past lamp-to-lamp distance lamp_width which is stored in the memory, and the distance so calculated is compared with the distance between the subject vehicle and the preceding vehicle Vah which was calculated based on the disparity, whereby either of these distances is selected for update (step S40). Note that in the following descriptions, the former distance is represented as Zc and the latter distance as Zdp.

The latter distance Zdp to the preceding vehicle Vah which is based on the disparity dp has already been calculated by the three-dimensional object detection module 11 based on the disparity dp calculated by the positional information collecting unit 9. The distance Zc is calculated by substituting i in Equation (1) above by the distance cr_i−cl_i between the lamp detection points which is obtained in this time's sampling cycle, reading out the lamp-to-lamp distance lamp_width stored in the memory, and substituting X in Equation (1) above by the lamp-to-lamp distance lamp_width so read out.

In addition, the distance Zc and the distance Zdp are compared with the distance Z to the preceding vehicle Vah which was selected and updated in the past sampling cycle and is now stored in the memory, so that a smaller value in variation is selected so as to overwrite the distance Z stored in the memory to be stored as the distance Z. Namely, in the event that the distance Zc is closer to the past distance Z to the preceding vehicle Vah than the distance Zdp, the distance Zdp, which was calculated and measured by the three-dimensional object detection module 11 is modified by the distance Zc and the distance Zc is stored.

In this way, the distance Z between the subject vehicle and the preceding vehicle Vah is updated. In the event that another unit such as a radar system is used as the distance measuring unit, the system so adopted is, needless to say, configured such that a distance Z which results from measurement and the distance Zc are compared for selection. In addition, the system can also be configured such that for example, the reliability of the distance Zc itself and the reliability of the distance Zdp itself are calculated, and the distance which is larger in variation from the distance Z but whose reliability is higher is selected over the distance which is smaller in variation from the distance Z but whose reliability is lower for update.

In the tail lamp area detecting and data calculating operation, finally, a lamp-to-lamp distance lamp_width is calculated for update (step S41). In this embodiment, the lamp-to-lamp distance lamp_width is made to be calculated by smoothing the distance W between the lamp detection points which are detected this time in the actual space by a time constant filter which is expressed by the following equation (15).

$$\text{lamp\_width} \leftarrow \text{lamp\_width} \times 0.95 + W \times 0.05 \quad (15)$$

Note that the smoothing may be implemented by employing other smoothing filters such as a Kalman filter and a moveing average filter.

As has been described heretofore, according to the preceding vehicle detection system 1 according to the embodiment, by paying attention to the shape of the tail lamps of the preceding vehicle which are captured by the image capture module 2 and making use of the knowledge that a vertical length of an illuminated area of the tail lamp of the preceding vehicle Vah gets shorter or at least does not get longer on the captured image towards left and right ends of the tail lamp as is shown in FIGS. 20A to 20C and that once the vertical length of the illuminated area starts getting shorter, the vertical length never starts getting longer again in any case, the area where the tail lamp is captured (the tail lamp area) is made to be detected in the captured image.

Namely, in detection of the tail lamp, the pixel line pls which extends vertically is set as the reference for detection, and the pixel lines pl are scanned in the leftward and rightward directions from the reference pixel line pls to detect the highly bright areas or pixel areas having the high luminance on the respective pixel lines pl so scanned. As this occurs, the length of the highly bright areas is monitored, so as to determine whether or not the length starts to decrease.

Then, in the event that it is determined that there exists the tendency that the length is getting shorter, the length of the highly bright areas continues to be monitored while maintaining the determination, and the scanning of the pixel lines pl is stopped at the point in time at which the length of the highly bright area starts to increase again after it once reached its minimum value, and the detection of the tail lamp area is ended.

By adopting the detection process like this, even though the preceding vehicle detection system is equipped only with the image capture for capturing an image in gray scale, it is possible to eliminate effectively the influence of light from a light source other than the tail lamp of the preceding vehicle Vah such as the light Lhead of the headlamp of the oncoming vehicle Vonc, as is shown in FIG. 21, for example, which is captured integrally with the light of the tail lamp of the preceding vehicle Vah on the captured image.

In addition, due to this, it is possible to discriminate the light of the tail lamp of the preceding vehicle Vah from light of any other light source effectively, thereby making it possible to detect the tail lamp of the preceding vehicle stably and in an ensured fashion in the captured image.

Note that while in this embodiment, the configuration has been described in which the reference image T is used as the image to which the tail lamp area detecting operation is applied, the invention is not limited thereto, and hence, the reference image T and the comparison image are made to be compared with each other so as to select of the images the image which has the capturing stability of the tail lamps.

Specifically, firstly, as the capturing stability of tail lamps, rates of change by time of the transverse lengths of the tail lamps on the reference image T and the comparison image are calculated independently for each of the images. Following this, the tail lamp area detecting operation is applied independently to the reference image T and the comparison image, and the tail lamp areas detected from the image having the smaller length change rate by time are selected as a final output.

By adopting this configuration, the tail lamps of the preceding vehicle can be detected stably and in an ensured fashion. In addition, in place of the rate of change by time of the transverse lengths of the tail lamps, a rate of change by time of the vertical heights of the tail lamps, the areas of the tail lamps or the distance between the left and right tail lamps may be used as the measure of capturing stability of tail lamps. Furthermore, a lateral symmetry with respect to the positions of the left and right tail lamps is obtained based on the center position of the preceding vehicle, and the lateral symmetry so obtained can be the measure of capturing stability of tail lamps.

Next, various operations can be implemented by making use of the information on the tail lamps of the preceding vehicle which are detected by the preceding vehicle detection system according to the embodiment. Hereinafter, those operations is described.

[Estimation of Image Area of Preceding Vehicle]

As has been described above, in the preceding vehicle detection system 1 according to this embodiment, the reference image and the comparison image are formed, and the stereo matching operation is applied to the images so formed so as to calculate a disparity dp. Then, the distances in the actual space to the respective points captured on the reference image are calculated based on the disparities dp so calculated, so as to detect the three-dimensional objects for detection of the preceding vehicle.

Figure 28:
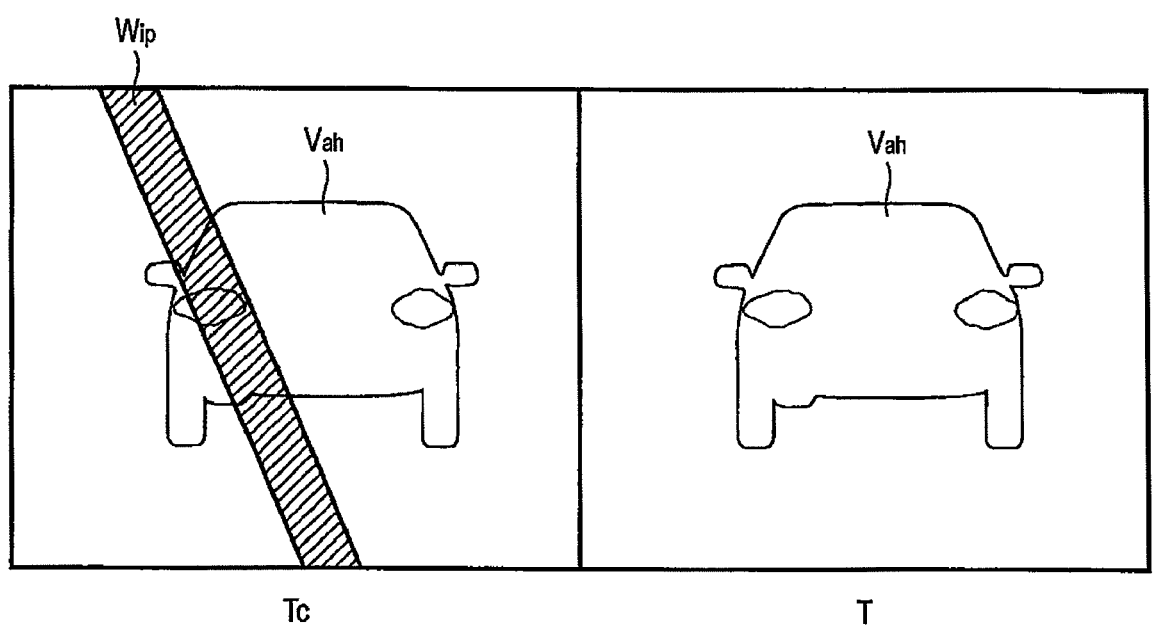
FIG. 28 is a diagram illustrating a situation where the tail lamp is not captured due to a wiper reflected on the image.

In the preceding vehicle detection system 1 like this, when the wiper passes in front of the cameras while driving the vehicle during a rainy night, for example, as is shown in FIG. 28, there may occur a situation where of the reference image and the comparison image, the wiper Wip is reflected on the comparison image, for example, whereby one of the tail lamps of the preceding vehicle Vah cannot be captured.

Figure 29:
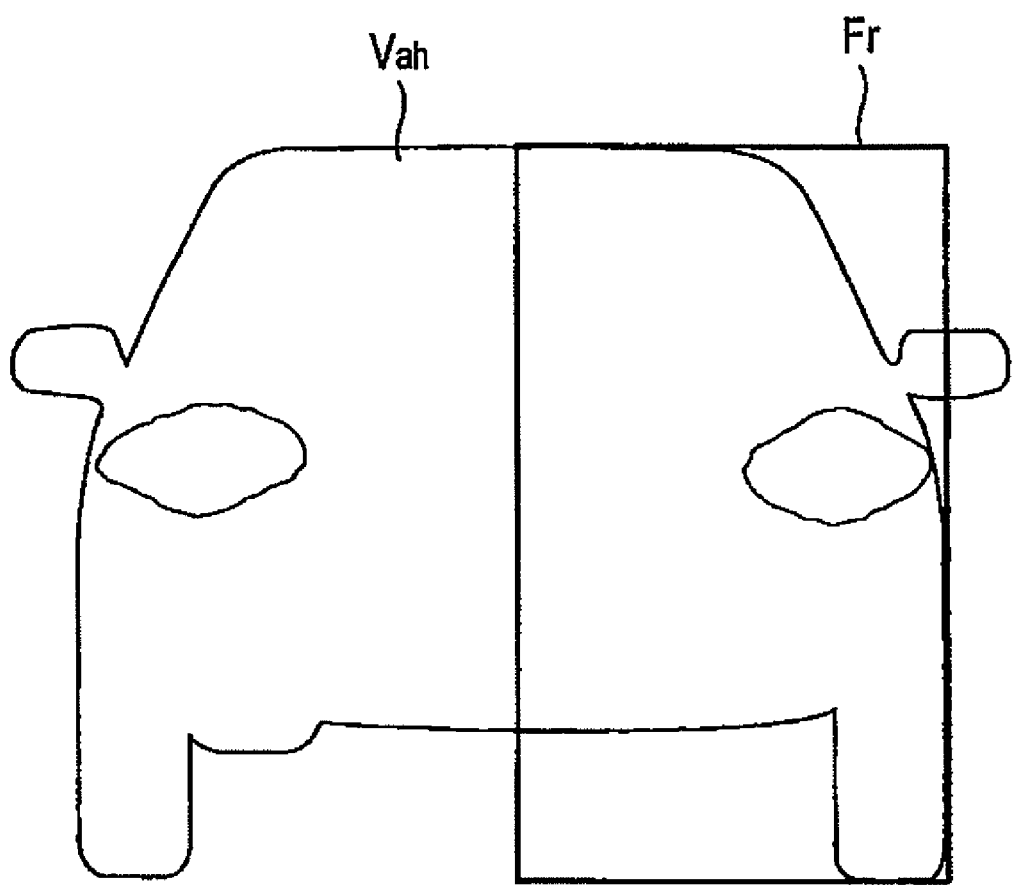
FIG. 29 is a diagram illustrating a situation where only one half of the preceding vehicle is detected by a frame line.

As this occurs, since the matching cannot be implemented in the image area of the tail lamp (the left-side tail lamp in FIG. 28) which was not captured, as is shown in FIG. 29, the preceding vehicle Vah is detected in such a state that only about half of the preceding vehicle Vah is surrounded by the frame line Fr. Due to this, the detecting stability of the preceding vehicle Vah is decreased.

In addition, in the preceding vehicle detection system 1, as has been described above, since the preceding vehicle is designed to be tracked while the information on the preceding vehicle is updated, once only one side of the preceding vehicle is recognized as the preceding vehicle, only the one side of the preceding vehicle is tracked, this may lead to a situation where it is difficult to return to the normal tracking state where the whole of the rear side of the preceding vehicle which includes both the left and right tail lamps thereof is grasped as the preceding vehicle.

Figure 25:
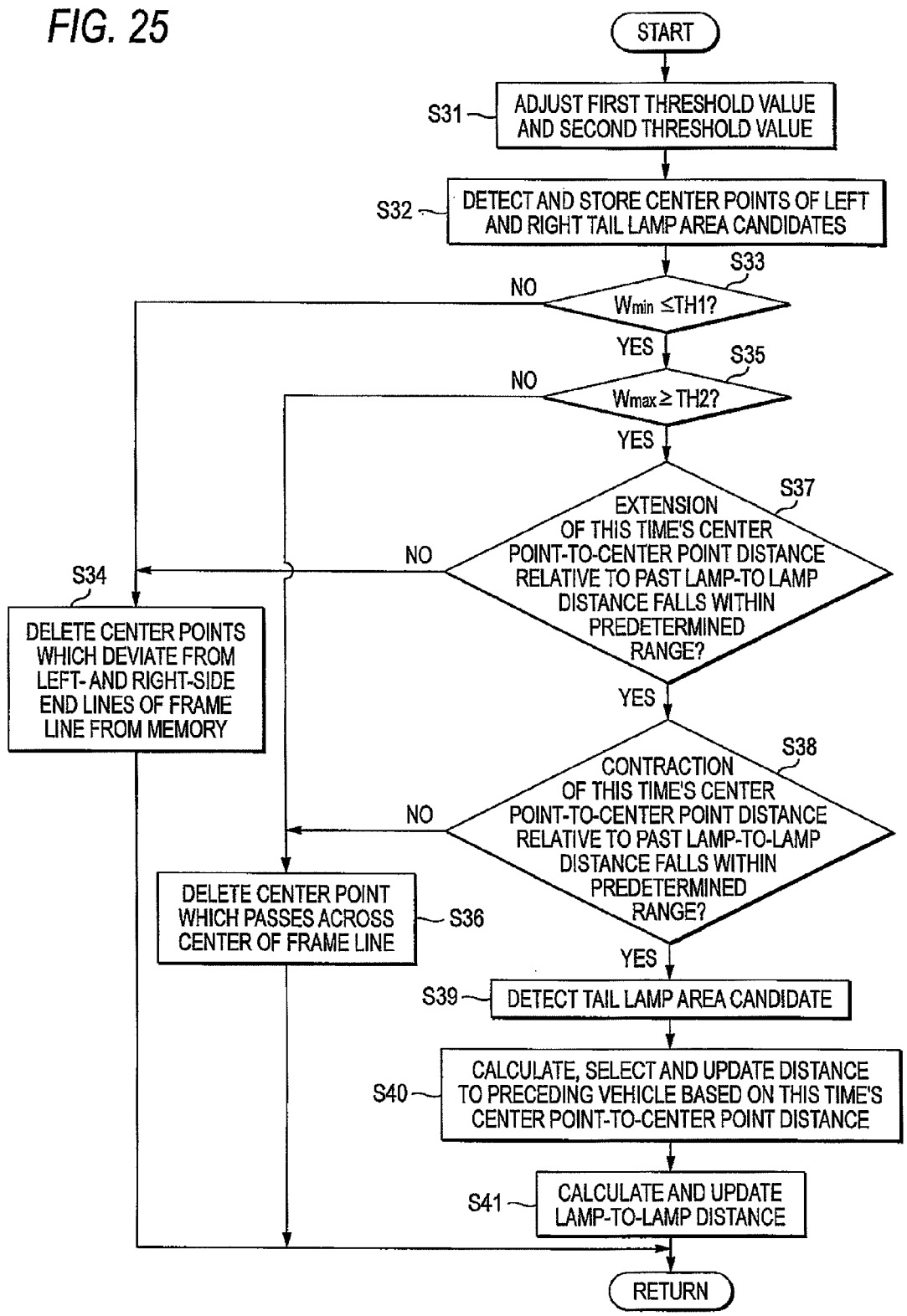
FIG. 25 is a flowchart showing a procedure of a tail lamp area detecting and data calculating operation.

In addition to the configuration of the embodiment that has been described above, to deal properly with a situation where in the tail lamp detecting operation, only one of the left and right tail lamp areas of the preceding vehicle Vah can be detected, that is, the situation where in the operations at the steps S34 and S36 in the tail lamp area detecting and data calculating operation shown in FIG. 25, for example, the information on only one of the tail lamp area candidates is deleted from the memory, the tail lamp detection module 14 of the preceding vehicle detection system 1 can be configured so as to estimate the position of the other tail lamp area candidate based on the coordinates of the central point, that is, the lamp detection point of the tail lamp area candidate so captured and the past lamp-to-lamp distance to thereby estimate the image area where the whole of the rear side of the preceding vehicle is captured.

Figure 30:
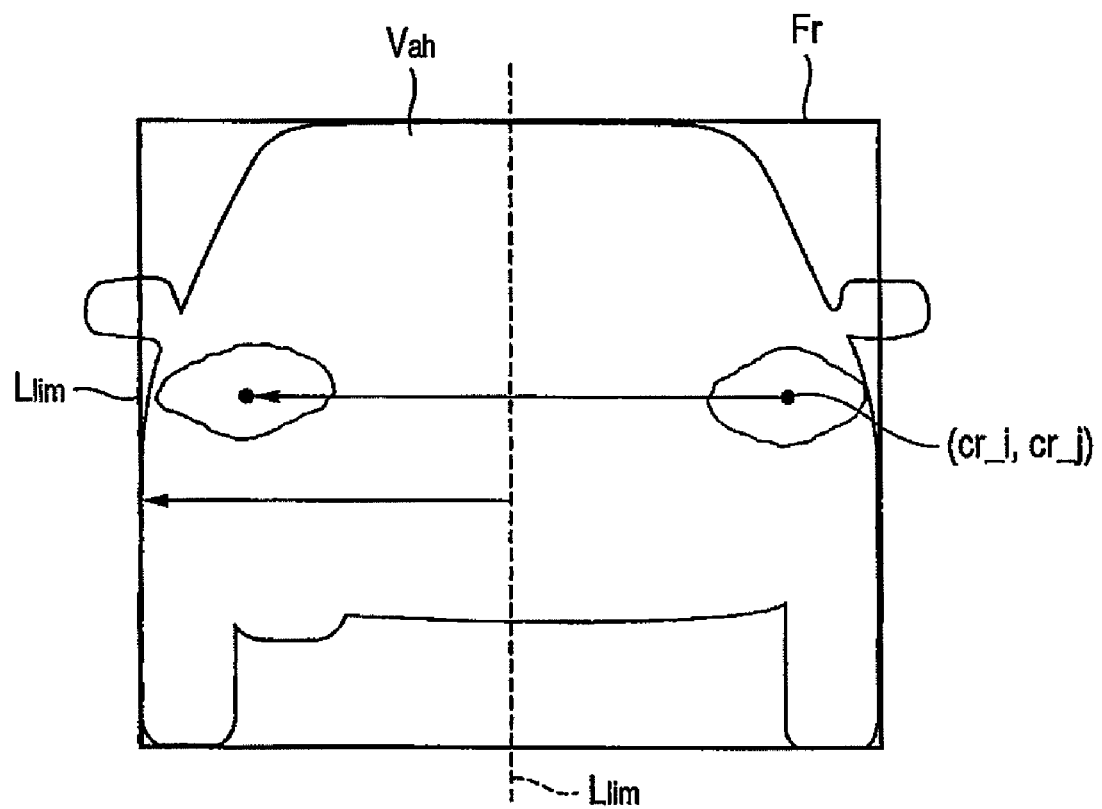
FIG. 30 is a diagram illustrating the expansion of the frame line.

Specifically, the distance Z in the actual space between the subject vehicle and the preceding vehicle Vah which was used to set the frame line Fr as shown in FIG. 29, for example, is substituted for Z in Equation (1) above, and the past lamp-to-lamp distance lamp_width stored in the memory is read out to be substituted for X in Equation (1) above to obtain i. Since this i represents the number of pixels between the central points of the left and right tail lamp areas on the reference image T, as is shown in FIG. 30, in this case, a point which lies apart leftwards by the i from the lamp detection point (cr_i, cr_j) of the right-side tail lamp that has been detected is estimated as the lamp detection point of the left-side tail lamp. Then, the position of the left-side end line Llim of the frame line Fr is estimated based on the ratio of the lamp-to-lamp distance lamp_width stored in the memory to the vehicle-width car_width so as to expand the frame line Fr leftwards.

By adopting the configuration like this, the frame line Fr which indicates the preceding vehicle Vah, that is, the image area in the image where the preceding vehicle is captured can be detected in the normal state. In addition, since it is determined that as long as one of the tail lamp areas is detected, the preceding vehicle Vah is running for certain ahead of the subject vehicle, the expanding operation of the frame line Fr like that is made to continue as long as the one of the tail lamp areas continues to be detected, so that the detecting stability of the preceding vehicle Vah can be maintained or increased by bringing the frame line Fr back to the normal state, thereby making it possible to track the preceding vehicle in an ensured fashion.

[Estimation of Distance between Subject Vehicle and Preceding Vehicle]

Figure 31:
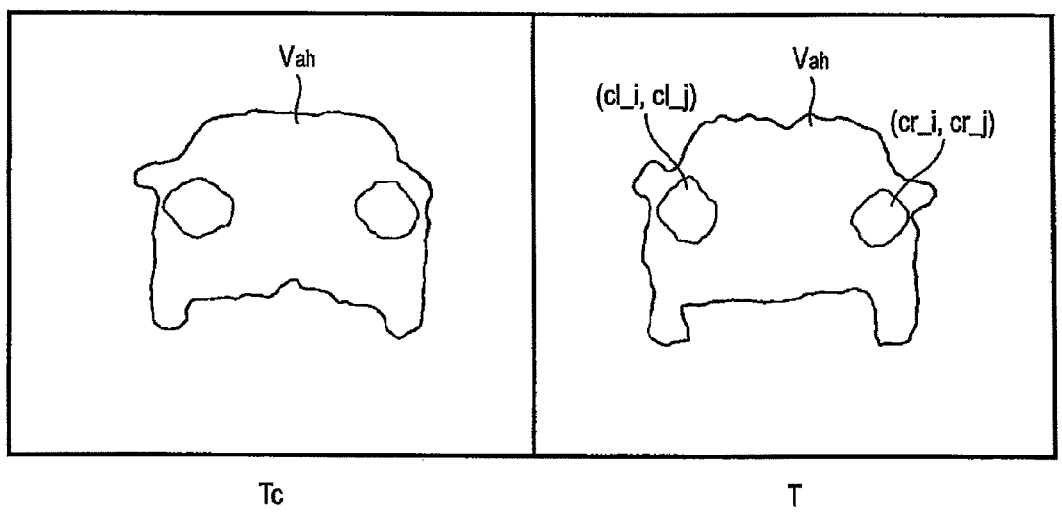
FIG. 31 is a diagram illustrating exemplarily the preceding vehicle captured in deformed states.

In addition, when it comes to rain heavily, the windshield lying in front of the cameras gets wet heavily, and as is illustrated exemplarily in FIG. 31, the preceding vehicle comes to be captured as being deformed on the reference image T and the comparison image Tc. In this state, since the wet conditions on the windshield between in front of the main camera $2a$ and in front of the sub-camera $2b$ become different, even though the same preceding vehicle is captured by those cameras, the edge portion of the preceding vehicle so captured is formed into different shapes on the reference image T and the comparison image Tc.

Due to this, when the stereo matching operation is performed in the way described above, there may occur a situation where the matching is not implemented properly, whereby erroneous disparities are calculated, and the distance Z between the subject vehicle and the preceding vehicle Vah is calculated to be an abnormal value. In addition, a situation may occur where no matching can be implemented. Additionally, even when the distance Z to the preceding vehicle Vah is measured by a radar system, a situation may arise where the distance cannot be measured well due to the rain affecting the measuring conditions.

As this occurs, in the preceding vehicle detection system 1 according to the embodiment, as has been described above, at the step S40 in the tail lamp area detecting and data calculating operation shown in FIG. 25, the distance Zc calculated based on the transverse distance cr_i–cl_i on the image between the left and right lamp detection points (cl_i, cl_j), (cr_i, cr_j) which are obtained in this time's sampling cycle is made to be compared with the distance Zdp between the subject vehicle and the preceding vehicle Vah which was calculated based on the disparities dp, so that the distance showing the more appropriate value is detected as the distance Z to the preceding vehicle Vah for update.

Due to this, even though the distance measuring unit measures a distance of an abnormal value or cannot measure any distance, it is possible to calculate the distance Z between the subject vehicle and the preceding vehicle Vah which shows the normal value or the distance Z which is close to the normal value. In addition, by grasping accurately the positional relationship of the preceding vehicle Vah relative to the subject vehicle in the way described above, the detecting stability of the preceding vehicle Vah can be maintained or increased by tracking accurately the preceding vehicle Vah without losing the same.

In addition, in order to detect the distance Z between the subject vehicle and the preceding vehicle Vah more accurately, when the distance selected as the value which is close to the normal value as a result of the distance Zc being compared with the distance Zdp is compared with the past distance Z between the subject vehicle and the preceding vehicle Vah which is stored in the memory to find out that the variation therebetween does not fall within the predetermined range, the selected distance is not overwritten in the memory but is rejected, so that the distance Z between the subject vehicle and the preceding vehicle Vah can be treated as not having been detected in this time's sampling cycle.

[Measurement of Distance Based on Information on Tail Lamp Area]

Although this operation has nothing to do with the detection under the rainy weather as with the operation example that was described just now, according to the preceding vehicle detection system 1 according to the embodiment, the tail lamps of the preceding vehicle Vah can be detected clearly. Consequently, apart from the detection of the three-dimensional objects in the embodiment that has been described above, the distance Z between the subject vehicle and the preceding vehicle Vah can be measured based on disparities dp which are obtained as a result of a stereo matching operation being applied to the edge portions of the tail lamp areas which are detected clearly.

Then, in addition to the configuration of the embodiment that has been described above, the tail lamp detection module 14 of the preceding vehicle detection system 1 can be configured such that the range image is read out from the range data memory 8 of the image processing module 6, the information on the past tail lamp areas is read out from the memory, the disparities dp of the image portion of the predetermined range which includes the past tail lamp areas are extracted from the range image so as to calculate a mean value and a most frequently occurring value of the disparities so extracted, and the mean value or most frequently occurring value of the disparities dp is substituted for dp in Equation (3) so as to measure the distance Z between the subject vehicle and the preceding vehicle Vah.

By adopting the configuration like this, even in the event that the edge portion of the vehicle body of the preceding vehicle cannot be captured clearly, for example, on the dark road at night, and the distance between the subject vehicle and the preceding vehicle cannot be calculated based on the stereo matching operation which is applied to the edge portion of the vehicle body or even though the distance can be calculated, the distance so calculated lacks reliability, by applying the stereo matching operation to the edge portions of the highly bright tail lamp areas which are clearly discriminated from the low bright areas which lie thereround, the distance Z between the subject vehicle and the preceding vehicle Vah can be measured accurately.

In addition, the reliability of the distance Z between the subject vehicle and the preceding vehicle Vah can be increased in the way described above, and the positional relationship of the preceding vehicle Vah relative to the subject vehicle can accurately be grasped, whereby the preceding vehicle Vah can be tracked accurately without being lost, thereby making it possible to maintain or increase the detecting stability of the preceding vehicle Vah.

[Recognition of Illumination of Brake Lamps]

Normally, in vehicles, the tail lamps and the brake lamps are located in the same positions on the rear side thereof, or they are located in positions which are very close to each other. Due to this, when the brake lamps are illuminated at night with the tail lamps illuminated, on the image where they are captured, it looks like, as it were, the illuminated areas of the tail lamps expand.

Due to this, in this embodiment, the total numbers of pixels in the tail lamp areas are counted as has been described above, whereby the illumination of the brake lamps can be identified by identifying changes in the total numbers of pixels in the tail lamp areas.

Then, in addition to the configuration of the embodiment that has been described above, the tail lamp detection module 14 of the preceding vehicle detection system 1 can be configured such that the total numbers of pixels of the tail lamp areas which are so counted are monitored, and when the numbers are increased by a predetermined ratio or more, the illumination of the brake lamps can be identified.

Specifically, for example, the total numbers of pixels which belong to the left and right tail lamp areas of the preceding vehicle Vah are made to be preserved in the memory for a predetermined number of sampling cycles in the past for the left and right tail lamps, respectively, and judging that the brake lamps are illuminated when the total numbers of pixels satisfy the following conditions, for example, illumination information is made to be outputted.

Condition 8: As is shown in a graph in FIG. 32, in the total of the total numbers of pixels of the left and right tail lamp areas, when comparing a mean value n1 of the totals for a sampling cycle τ1 immediately before the current sampling cycle t and a mean value n2 of the totals for a sampling cycle τ3 before the sampling cycle τ1 with an interval cycle τ2 provided therebetween, the mean value n1 is increased, for example, by 40% or more over the mean value n2.

Condition 9: A graph similar to that in FIG. 32 is prepared for each of the total numbers of pixels for the left and right tail lamp areas, and values are compared in a similar way to Condition 8 to find out an increase of 20% or more for each of the left and right tail lamp areas.

In addition, on the contrary to the above, at a point in time at which the mean value n1 is decreased by a predetermined ratio from the mean value n2, the turning off of the brake lamps is identified, and for example, the outputting of the illumination information is made to be stopped.

In addition, as this occurs, the adjusting operation (step S31) of the first threshold value br_th1 and the second threshold value br_th2 in the tail lamp area detecting and data calculating operation shown in FIG. 25 is activated. Because of this, although the standard based on which the total numbers of pixels of the left and right tail lamp areas are counted changes due to the adjustment of the threshold values and other correcting operations including the control of the shutters of the cameras or the distance between the subject vehicle and the preceding vehicle Vah, in this identification of the illumination of the brake lamps, a re-correcting operation is performed on the standard so as to unify the same for each sampling cycle, so that the comparisons of the mean values are carried out.

By adopting the configuration like this, the turning on and off of the brake lamps can be identified in an ensured fashion, whereby the safety driving mechanism such as the automatic steering or automatic brake control is activated appropriately based on the information on the brake lamps, and, for example, a collision preventive mechanism against the preceding vehicle Vah can be activated properly based on the information.

In addition, the behaviors of the preceding vehicle Vah can be grasped accurately, whereby the detecting stability of the preceding vehicle Vah can be maintained or increased by tracking it accurately.

[Vehicle Recognition]

For example, when a three-dimensional object exists far ahead of the subject vehicle, if the three-dimensional object constitutes an obstacle to the subject vehicle, the subject vehicle may only have to be steered autonomously so as to pass by the obstacle without decreasing the current speed thereof. However, in the event that the three-dimensional object ahead of the subject vehicle is a preceding vehicle, which is being stopped, the automatic brake control has to be performed on the subject vehicle so that the subject vehicle is not allowed to pass by the preceding vehicle but is stopped at the rear thereof.

Since the automatic control of the subject vehicle differs largely in this way depending on the types of the three-dimensional objects, it is very important to determine whether a three-dimensional object, in particular, when it lies on the traveling course of the subject vehicle, is an obstacle thereto or a preceding vehicle.

Then, in addition to the configuration of the embodiment that has been described above, the tail lamp detection module 14 of the preceding vehicle detection system 1 can be configured such that as to a three-dimensional object detected by the three-dimensional object detection module 11, in particular, a three-dimensional object which lies on the traveling course of the subject vehicle, for example, a position is searched which lies apart one eighth or one sixth of the width of three-dimensional object from the left-side end line Llim or the right-side end line Rlim of the frame line Fr which indicates the three-dimensional object, and when two left and right highly bright areas are detected, in the event that a difference in vertical pixel number between respective highest points Jmax (refer to FIG. 26) of those two highly bright areas and a difference in vertical pixel number between respective lowest points Jmin each fall within five pixels and a ratio of the number of pixels which belong to one of the highly bright areas to the number of pixels which belong to the other highly bright area falls within a predetermined ratio such as the one being 1.5 times larger than the other, the three-dimensional object which includes these two highly bright areas is determined as a vehicle.

By adopting the configuration like this, the three-dimensional object ahead of the subject vehicle can be determined as the vehicle when the conditions described above are satisfied, and for example, the automatic brake control is activated to operate well before the vehicle lying ahead of the subject vehicle or by changing the preceding vehicle detecting distance which is set ahead of the subject vehicle to be increased, the safety driving performance of the subject vehicle can be increased.

What is claimed is:

1. A preceding vehicle detection apparatus comprising:
    a computer;
    an image capture unit for capturing an image of surroundings of a subject vehicle;
    a preceding vehicle detection unit for detecting a preceding vehicle from the image captured by the image capture unit; and
    a tail lamp detection unit for detecting a pixel area having a luminance which is larger than or equal to a first threshold value on a pixel line vertically extending in the image and detecting a pixel area in each pixel line while scanning pixel lines in leftward and rightward directions from the pixel line set as a reference so as to detect areas where tail lamps of the preceding vehicle are captured from the image,
    wherein when it is determined, with input from the computer, that the number of pixels of the pixel area detected on each pixel line while the pixel lines on the image are being scanned in each of the leftward and rightward directions tends to decrease as the pixel lines are scanned in each of the directions, the tail lamp detection unit finishes the detection of the pixel area at a pixel line whose pixel number is more than or equal to a constant number times of a minimum value of the pixel number.

2. The preceding vehicle detection apparatus according to claim 1,
    wherein the tail lamp detection unit stores a maximum value of the pixel number of the pixel area detected on each of the pixel lines while updating the maximum value thereof, and determines the decreasing tendency in pixel number at a point in time at which a pixel area is whose pixel number is less than a constant number times of the maximum value detected on a certain pixel line, and
    the determination is continued to hold during subsequent detections of the pixel area.

3. The preceding vehicle detection apparatus according to claim 1,
    wherein the tail lamp detection unit respectively detects pixels which constitute central points of the detected areas from the detected areas where the left and right tail lamps of the preceding vehicle are captured, and calculates a distance between the pixels detected as the left and right central points.

4. The preceding vehicle detection apparatus according to claim 3,
wherein during detecting the area where the right-side tail lamp of the preceding vehicle is captured on the image, in detection of the pixel area on a pixel line which lies apart by the distance between the pixels constituting the left and right central points which was calculated in the past from a pixel line lying at a right edge of the left-side tail lamp and pixel lines lying further rightwards than the pixel line on the image, the tail lamp detection unit finishes the detection of the pixel area at a point in time at which an upper end position of the pixel area detected on the image becomes higher than an upper end position of the left-side tail lamp or at a point in time at which a lower end position of the detected pixel area becomes lower than a lower end position of the left-side tail lamp.

5. The preceding vehicle detection apparatus according to claim 3,
wherein the tail lamp detection unit sets a pixel line which constitutes a reference for detection of the pixel area in a pixel line which includes the pixel detected as the central point of the tail lamp in the past.

6. The preceding vehicle detection apparatus according to claim 5,
wherein when a current luminance of the pixel detected as the central point of the tail lamp in the past is a luminance which is equal to or higher than a second threshold value which is set equal to or higher than the first threshold value, the tail lamp detection unit detects only the pixel area which includes the pixel on the pixel line.

7. The preceding vehicle detection apparatus according to claim 3,
wherein the tail lamp detection unit sets a pixel line which constitutes a reference for detection of the pixel area in a pixel line which includes a pixel which lies apart by the distance between the pixels constituting the left and right central points which was calculated in the past from a pixel which constitutes the central point of the tail lamp lying on an opposite side to the tail lamp on which the detection is performed.

8. The preceding vehicle detection apparatus according to claim 3 further comprising:
a unit for detecting left and right edges of the preceding vehicle captured in the image,
wherein the tail lamp detection unit sets a pixel line which constitutes a reference for detection of the pixel area in a pixel line which lies inwards by a rate of a width between the left and right edges from the left end or right end of the preceding vehicle which is detected by the unit.

9. The preceding vehicle detection apparatus according to claim 5,
wherein the preceding vehicle detecting unit detects the preceding vehicle captured in the image by surrounding the preceding vehicle by a rectangular frame line, and
when a plurality of pixel areas are detected on the pixel line in an image area within the frame line, the tail lamp detection unit detects a pixel area which has a largest pixel number in the plurality of pixel areas as an area where the tail lamp of the preceding vehicle is captured.

10. The preceding vehicle detection apparatus according to claim 9,
wherein when a pixel area which includes a lower edge of the frame line is included in the plurality of pixel areas detected on the pixel line, and the other pixel area is closer to the pixel which was detected as the central point of the tail lamp in the past or a center between an upper edge and the lower edge of the frame line than the pixel area which includes the lower edge of the frame line, the tail lamp detection unit detects the other pixel area in preference to the pixel area which includes the lower edge of the frame line.

11. The preceding vehicle detection apparatus according to claim 3,
wherein when one of the areas where the left and right tail lamps of the preceding vehicle are captured is not detected in the current detection,
the tail lamp detection unit estimates an image area in the image where the preceding vehicle is captured by estimating the position of the other area based on a distance between the pixels which constitutes the left and right central points on the image.

12. The preceding vehicle detection apparatus according to claim 3 further comprising,
distance measuring unit for measuring a distance between the subject vehicle and the preceding vehicle,
wherein the tail lamp detection unit modifies the distance measured by the distance measuring unit based on a distance between the pixels which constitute the left and right central points.

13. The preceding vehicle detection apparatus according to claim 1,
wherein the image capture device comprises a plurality of image capture members,
wherein the tail lamp detection unit calculates a distance between the subject vehicle and the preceding vehicle based on information on a disparity obtained by performing a stereo matching operation on edge portions of respective areas where the tail lamps of the preceding vehicle are captured in a plurality of images captured by the plurality of image capture members.

14. The preceding vehicle detection apparatus according to claim 1,
wherein the tail lamp detection unit recognizes the illumination of a brake lamp by recognizing an increase in the number of pixels which belong to the area of tail lamp of the preceding vehicle by a predetermined rate or more.

15. The preceding vehicle detection apparatus according to claim 1,
wherein when a difference in the number of pixels in a vertical direction between the images of the two image areas detected is within a predetermined number of pixels and a ratio of the number of pixels which belong to one of the area to the number of pixels which belong to the other area is within a predetermined ratio, the tail lamp detection unit determines that a three-dimensional object which includes the two areas is a vehicle.

16. A preceding vehicle detection apparatus comprising:
a processor;
an image capture unit for capturing an image of surroundings of a subject vehicle;
a preceding vehicle detection unit for deleting a preceding vehicle from the image captured by the image capture unit; and
a tail lamp detection unit for detecting a pixel area having a luminance which is larger than or equal to a first threshold value on a pixel line vertically extending in the image and detecting a pixel area in each pixel line while scanning pixel lines in leftward and rightward directions from the pixel line set as a reference so as to detect areas where tail lamps of the preceding vehicle are captured from the image, wherein when it is determined, with input from the processor, that the number of pixels of the pixel area detected on each pixel line while the pixel lines on the image are being scanned in each of the leftward and rightward directions tends to decrease as the pixel lines are scanned in each of the directions, the tail lamp detection unit finishes the detection of the pixel area at a pixel line whose pixel number is more than or equal to a constant number times of a minimum value of the pixel number.

17. The preceding vehicle detection system according to claim 16, wherein the tail lamp detection unit respectively detects pixels which constitute central points of the detected areas from the detected areas where the left and right tail lamps of the preceding vehicle are captured, and calculates a distance between the pixels detected as the left and right central points.

18. The preceding vehicle detection system according to claim 16, wherein the tail lamp detection unit recognizes the illumination of a brake lamp by recognizing an increase in the number of pixels which belong to the area of tail lamp of the preceding vehicle by a predetermined rate or more.

19. A preceding vehicle detection apparatus comprising:
an image capture device for capturing an image of surroundings of a subject vehicle;
a preceding vehicle detection device which is in communication with said image capture device and which detects a preceding vehicle from the image captured by the image capture device; and
a tail lamp detection device which receives data from said image capture device and detects a pixel area having a luminance which is larger than or equal to a first threshold value on a pixel line vertically extending in the image and detecting a pixel area in each pixel line while scanning pixel lines in leftward and rightward directions from the pixel line set as a reference so as to detect areas where tail lamps of the preceding vehicle are captured from the image,
wherein when it is determined that the number of pixels of the pixel area detected on each pixel line while the pixel lines on the image are being scanned in each of the leftward and rightward directions tends to decrease as the pixel lines are scanned in each of the directions, the tail lamp detection unit finishes the detection of the pixel area at a pixel line whose pixel number is more than or equal to a constant number times of a minimum value of the pixel number.

20. The preceding vehicle detection apparatus according to claim 19, wherein the tail lamp detection device respectively detects pixels which constitute central points of the detected areas from the detected areas where the left and right tail lamps of the preceding vehicle are captured, and calculates a distance between the pixels detected as the left and right central points.

21. The preceding vehicle detection apparatus according to claim 19 further comprising a traveling locust estimation unit and a vehicle condition sensor in communication with said traveling locust estimation unit.

* * * * *